United States Patent
Parakh

(10) Patent No.: US 9,229,869 B1
(45) Date of Patent: Jan. 5, 2016

(54) MULTI-LOCK CACHES

(71) Applicant: Amazon Technologies, Inc., Reno, NV (US)

(72) Inventor: Vishal Parakh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 274 days.

(21) Appl. No.: 13/720,893

(22) Filed: Dec. 19, 2012

(51) Int. Cl.
*G06F 12/08* (2006.01)

(52) U.S. Cl.
CPC .................................. *G06F 12/084* (2013.01)

(58) Field of Classification Search
None
See application file for complete search history.

(56) References Cited

U.S. PATENT DOCUMENTS

| | | | |
|---|---|---|---|
| 5,832,484 A * | 11/1998 | Sankaran et al. | |
| 6,480,950 B1 * | 11/2002 | Lyubashevskiy et al. | .... 711/206 |
| 8,099,538 B2 * | 1/2012 | Saha | ........ G06F 9/526 710/200 |
| 2008/0320262 A1 * | 12/2008 | McKenney et al. | ............ 711/163 |
| 2010/0217815 A1 | 8/2010 | Khan et al. | |
| 2011/0082908 A1 | 4/2011 | Ban | |
| 2011/0252192 A1 | 10/2011 | Busch et al. | |
| 2012/0054440 A1 | 3/2012 | Doig et al. | |
| 2012/0137075 A1 * | 5/2012 | Vorbach | ......................... 711/122 |
| 2012/0239871 A1 | 9/2012 | Badam et al. | |
| 2012/0311606 A1 * | 12/2012 | Marathe | .................. G06F 9/526 718/107 |
| 2013/0080672 A1 * | 3/2013 | Tal | ......................... G06F 9/526 710/200 |
| 2013/0290967 A1 * | 10/2013 | Calciu | ..................... G06F 9/526 718/102 |
| 2013/0339622 A1 * | 12/2013 | Ambroladze et al. | ........ 711/134 |

OTHER PUBLICATIONS

Designing and Implementing Scalable Applications with Memcached and MySQL, a MySQL White Paper, Jun. 2008.

* cited by examiner

*Primary Examiner* — Aimee Li
*Assistant Examiner* — Tracy Chan
(74) *Attorney, Agent, or Firm* — Knobbe, Martens, Olson & Bear, LLP

(57) ABSTRACT

Processes are disclosed for decreasing contention in caches in order to increase the efficiency of multi-threaded or multi-processor systems. By using multiple locks in a cache, smaller portions of the cache can be locked during cache updates (e.g., during a data update or a storage block eviction). As only small portions of the cache are locked at any given time, contention between threads, particularly in multi-processor implementations, will likely be reduced. For example, if different threads are trying to update different entries in the cache, the threads can proceed with updating the cache concurrently.

30 Claims, 8 Drawing Sheets

MULTI-LOCK CACHES

BACKGROUND

Caching is computer technology that allows computer processes to be accelerated. Generally, a computer uses multiple levels of memory types of varying sizes and speeds, with cheaper memory being generally slower and bigger in storage size and more expensive memory being generally faster and smaller in storage size. As faster memory is generally small in storage size, only a limited amount of data can be stored on the faster memory types in the computer. Generally described, caching attempts to anticipate what data items are needed by the computer in the future and attempts to keep those data items in the limited amounts of the faster memory types in order to improve performance by reducing access times to the data items. These data items can be maintained in a cache data structure in the computer memory.

Generally described, a cache (e.g., an application cache) includes a data structure that transparently stores data so that future requests for that data can be served faster. The data that is stored within a cache may include values that have been computed earlier or duplicates of original values that are stored elsewhere. If requested data is contained in the cache (e.g., cache hit), the request can be served by reading the cache instead of calculating the data or retrieving the data from elsewhere. If reading from the cache is faster than calculating or retrieving the data, then the request is served faster. Otherwise (e.g., cache miss), the data has to be recomputed or fetched from its original storage location, which can be comparatively slower. Generally, the greater the number of requests that can be served from the cache, the faster the overall system performance.

Generally, cache sizes are small relative to bulk computer storage. Nevertheless, caches have proven themselves useful in many areas of computing because access patterns in typical computer applications have locality of reference. For example, references exhibit temporal locality if data is requested again that has been recently requested already. In another example, references exhibit spatial locality if data is requested that is physically stored close to data that has been requested already. Thus, caches can be beneficial, despite not being able to fit only a portion of data stored in the bulk computer storage.

BRIEF DESCRIPTION OF DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

Overview

Figure 1A:
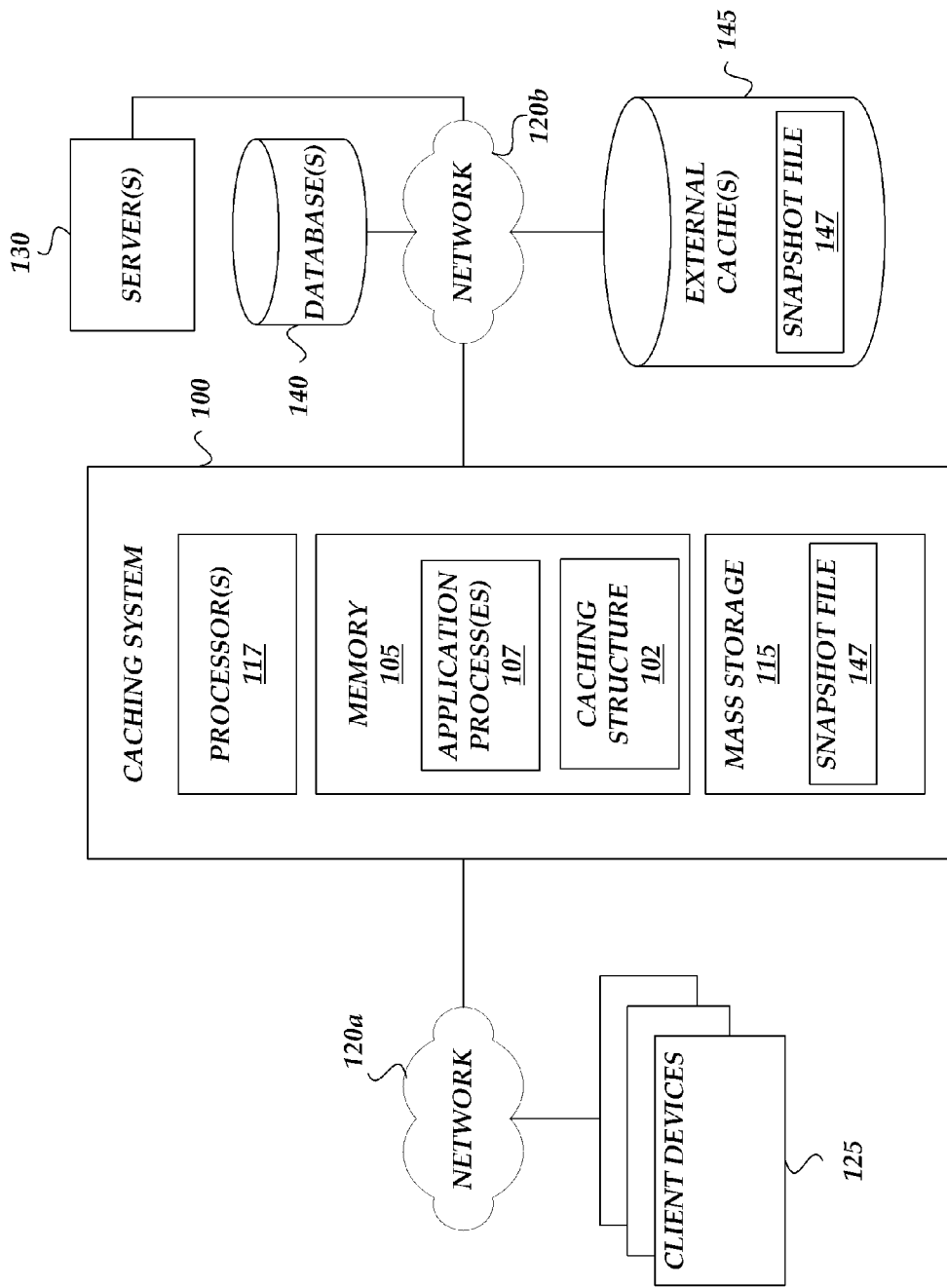
FIG. 1A is a block diagram schematically illustrating an embodiment of a caching system that utilizes a caching structure that increases cache hit rates.

Accessing slower memory types can cause computer processor unit (CPU) delay as the CPU waits for data items from the slower memory types to become available. This delay can be characterized as an expense that slows down the performance of a computing system. One solution to this problem involves caching data on faster memory types. However, as storage sizes of the faster memory types are limited, some searches for data items in the cache can result in a cache hit with the data item found and some searches can result in a cache miss, where the data item is not found. Thus, increasing the chances of the data item being found in the cache (sometimes referred to as the hit rate) can improve the performance of the computing system by reducing delays.

Processes are disclosed for increasing hit rates on caches in order to reduce the amount of time spent on cache misses. Typically, a cache miss involves obtaining data from a primary data storage that may be on the same computing device as the cache or on another networked device. Typically, the primary data storage is significantly slower, perhaps by an order of magnitude or more, than the caching memory. Thus, cache misses are relatively very expensive, time wise, compared to a cache hit. The disclosed processes increase the hit rate by more efficiently storing data on the caching memory, which results in more data being stored on the caching memory. With more data available in the cache, the chances of a cache hit increase.

In one embodiment, the processes involve using data structures that enable the cache to use fixed size blocks for storing data items. Using fixed size blocks reduces or eliminates external fragmentation or reduces or minimizes internal fragmentation. The fixed size blocks may be relatively small compared to data items, with larger data items being stored using multiple blocks. Because, in one embodiment, the blocks are relatively small, less space is wasted when a block is not completely filled by data items. For example, in some embodiments, on a 32-bit platform with random value sizes between 16 bytes and 1 MB, memory efficiency of about 92% (or about 89% on a 64-bit platform) is possible, where the memory efficiency generally describes the amount of data stored versus the amount of memory used to store the data.

In some embodiments, processes are disclosed for decreasing contention in caches in order to increase the efficiency of multi-threaded or multi-processor systems. By using multiple locks in a cache, smaller portions of the cache can be locked during cache updates (e.g., during a data update or storage block eviction). As only small portions of the cache are locked at any given time, contention between threads, particularly in multi-processor implementations, will likely be reduced. For example, if different threads are trying to update different entries in the cache, the threads can proceed with updating the cache concurrently.

Processes are also disclosed for embodiments of the caching system to utilize a snapshot file or other limited size data structure to store a portion of the data stored in a cache. The snapshot file can be stored on persistent storage so that, even in case of a restart, crash or power loss event, the data stored in the snapshot file persists and can be used by the caching system after starting up. The snapshot file can then be used to restore at least some data into the cache in cases where the cached data in the cache is lost. For example, in cases of a cold-start or restart, the caching system can load data from the snapshot file into the empty cache. This can increase the number of cache hits since the cache is repopulated with useful data at startup.

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential. The scope of protection of certain inventions is defined by the claims.

Examples of a Caching System

FIG. 1A is a block diagram schematically illustrating an embodiment of a caching system 100 that utilizes a caching structure 102 (sometimes referred to herein as a cache) that increases cache hit rates. The caching system 100 can include one or more computing devices comprising processor(s) 117, computer memory 105 and mass storage 115. In one embodiment, the caching system 100 includes a computer that uses the caching structure 102 to provide an in-memory cache to users of the computer. The computer can also be used to provide other functions and services, such as running virtual machine instances, providing computing resources such as computing power and storage, running one or more web servers and/or providing other computing services.

In one embodiment, the caching system 100 is part of a distributed caching system that includes multiple computing devices (e.g., servers, other computers, etc.). In one embodiment, instances of the caching system 100 handles caching on individual computing devices, which are connected and coordinated to form a distributed caching system that caches data across multiple computing devices.

Generally, caches include copies of data items that are kept temporarily in the cache but that are primarily stored, more persistently, elsewhere on a primary data storage device or devices. Cache memory is usually significantly smaller than these primary data storage devices and thus cannot fit all the data from the primary data storage device. Cache memory is also usually significantly faster than the primary data storage device. Therefore, caches typically attempt to include the most used data items from the primary data storage in order to improve the performance of a computing system.

In one embodiment, the caching structure 102 is maintained on the memory 105 of the caching system 100. The memory 105 can include processor cache (e.g., L1, L2, L3, etc.) and/or main memory (e.g., DDR RAM, SDRAM, other types of RAM, etc.). In some embodiments, the caching structure 102 uses multiple levels of memory, for example, small fast cache memory backed up by larger, slower main memory. For example, the caching structure 102 may operate by checking a smallest level 1 (L1) cache first; if it hits, the processor proceeds at high speed. If the smaller cache misses, the next larger cache (L2) is checked, and so on, before main memory is checked. In some embodiments, the caching structure 102 uses only a single cache memory type.

In some embodiments, the caching structure 102 utilizes small, fixed size storage blocks for storing data. By using small, fixed size storage blocks, more data can be stored on the same size of cache memory through higher efficiency. Generally, if a stored data item does not fill a storage block, the extra space is not used and is considered "wasted." For example, if a first cache uses 128 KB storage blocks and a second cache uses 1024 KB cache blocks, then if the caches store a 128 KB block, the first cache will have 0 (128 KB−128 KB=0) wasted space (100% efficiency), while the second cache will have 896 KB (1024 KB−128 KB=896 KB) of wasted space (12.5% efficiency). The efficiency advantage of using smaller storage blocks can also extend to larger stored data items. Generally, a data item can be subdivided into chunks equal to the block size, with any remainder data taking up a last storage block. If the last storage block is not filled, then space on the last block is wasted. Going back to the above example, if the caches stores 600 KB data item, the first cache uses five storage blocks with 40 KB (5*128 KB−600 KB=40 KB) of wasted space (93.75% efficiency), while the second cache uses one storage block with 400 KB (1024 KB−600 KB=400 KB) of wasted space (58.6% efficiency).

However, using smaller blocks can increase access times for the cache. For example, referring to the above example for the 600 KB data unit, five blocks need to be accessed from the first cache while only one block needs to be accessed on the second cache. Assuming the access times are roughly similar for different size blocks, the access time for the first cache for the 600 KB data unit may be up to 5 times longer than the second cache. In some cases, accessing multiple blocks can be even more expensive if the blocks are stored in the memory cache in non-contiguous blocks. Nevertheless, the first cache may still be faster on average even if the access times are longer per operation if the cache hit rate of the first cache is sufficiently higher than the cache hit rate of the second cache. For example, assume the first cache has an access time of 5X and a hit rate of 90% while the second cache has an access time of X and a hit rate of 80% and the cost of a cache miss is 100X, where X is some arbitrary period of time. Then, for 100 requests, the first cache, on average, will take 14.5X to serve each request (5X*90%+100X*10%=14.5X). Meanwhile, the second cache, on average, will take 20.8X (X*80%+100X*20%=20.8X). Thus, depending on the circumstances, higher cache access times from using smaller block sizes can be more than offset by higher hit rates because of the generally significantly higher costs of accessing the slower, primary storage device where the data is primarily kept.

The cache structure 102 can use data structures that can compensate or reduce the access times for the cache, even if small storage blocks are used. One example of such a cache structure 102 configuration is described in further detail in FIG. 2.

In one embodiment, the storage blocks in the caching structure 102 are uniform in size, though other embodiments may use non-uniform or variable sizes. The storage blocks size selected for the caching structure 102 may be based in part on cache line sizes for CPU caches. For example, many CPUs have cache lines of 32 bytes, 64 bytes, 128 bytes, 256 bytes or larger (e.g., 1024 bytes). In some embodiments, the storage block size is a multiple (e.g., 1×-8× multipliers or more) of the cache line size for the CPU in the computing device on which the cache structure 102 is located. For example, for 32 byte cache lines, the storage block sizes could be one of: 32 bytes, 64 bytes, 128 bytes, 256 bytes and other multiples. For different cache line sizes, the possible storage block sizes can be different. In some cases the block sizes may be less than 64 bytes (e.g., 32 bytes), 64-128 bytes, or greater than 256 bytes. In some embodiments, the upper bound on the storage block size is based in part on the CPU architecture. For example, in one embodiment, the storage block size is no more than half the first level cache size of the CPU. In another embodiment, the storage block size is no more than the page size used by the CPU. As different CPUs can use different architectures and have different page sizes, cache line sizes and/or first level cache sizes, the minimum or maximum storage block sizes can vary based on the particular computing system architecture on which the caching system 100 operates.

Figure 1B:
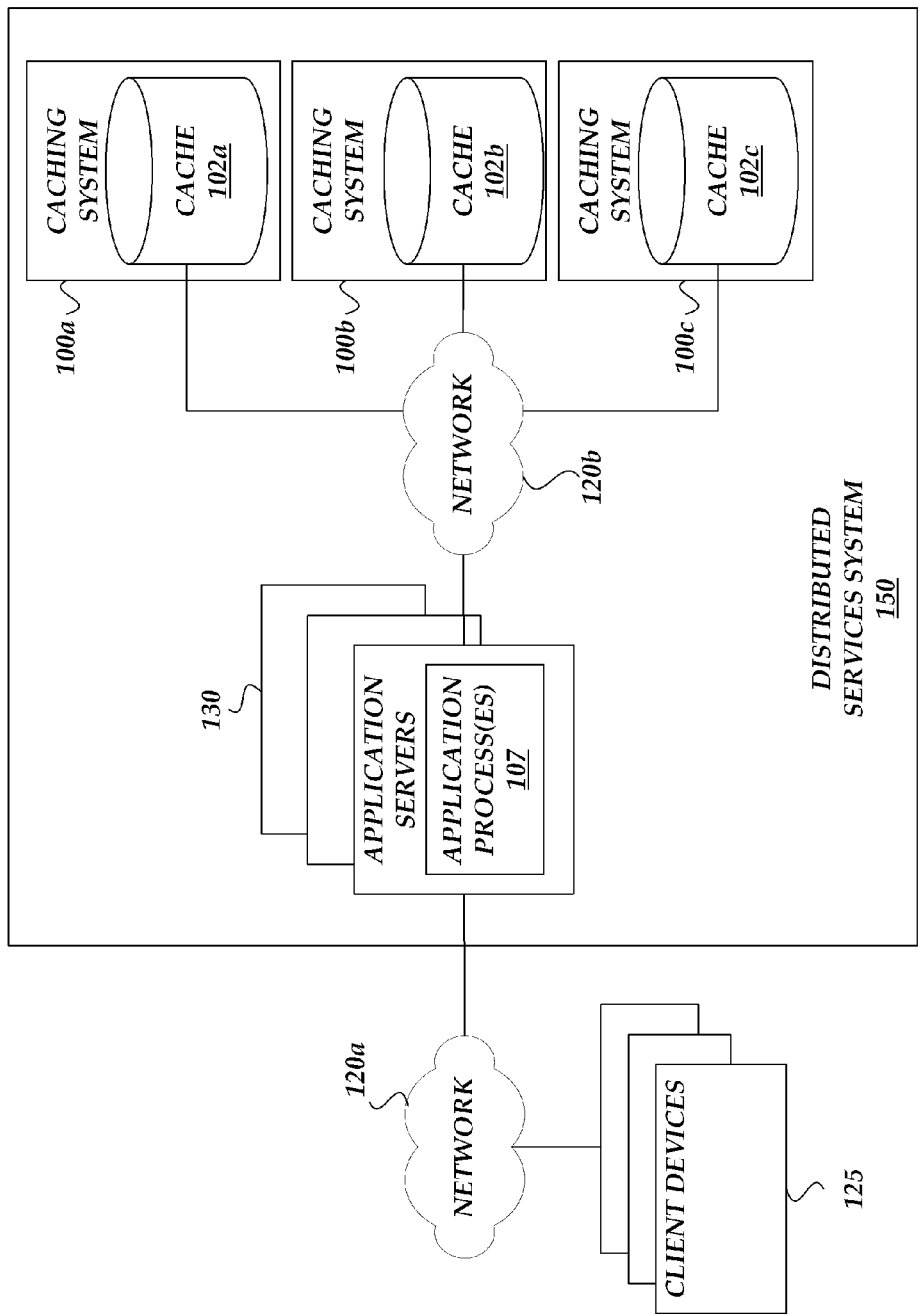
FIG. 1B is a block diagram schematically illustrating an embodiment of a distributed services system that utilizes one or more caching system of FIG. 1A.

In some embodiments, the caching system 100 is logically positioned between various computing services and one or more client devices 125 connected via a network 120a, as described in further detail in FIG. 1B. For example, the caching system 100 may be part of a cache server, cache proxy, web server or other computing service that processes request from the client devices. The caching system can receive data requests from the client devices, for example, on a network interface (e.g., Ethernet or other network interface card (NIC), 802.11a/b/g/n receiver, etc.). In one example, the client devices 125 operate web browsers that request web page data from the caching system 100. In one embodiment, the caching system requests and/or pre-processes web pages on behalf of the web browser users. In one embodiment, the caching system 100 is part of a cloud computing service provider that hosts many distinct web sites of many different entities, and the caching system caches data for those distinct web sites.

In one embodiment, the caching system 100 caches data from a variety of primary data sources, where the data is primarily stored. For example, data can be primarily stored on one or more mass storage devices 115 on the caching system. Such mass storage devices 115 can include mechanical drives (e.g., hard disk drives, optical disk, tape), solid state drives (SSDs) that use integrated circuit assemblies as memory to store data persistently, or combinations of the above (e.g., hybrid drives). Cached data can also be primarily stored on external systems. In some embodiments, the caching system 100 is connected, via a network 120b, to one or more servers 130, databases 140 and/or external caches 145 where the primary data is stored. For example, in the case of a cache miss, the caching system 100 can search for the data on other computing devices on the network 120b.

In some embodiments, the caching system 100 utilizes a snapshot file 147 or other limited size data structure to store a portion of the data stored in the caching structure 102. The snapshot file can be stored on persistent storage or other non-transitory storage so that, even in case of a restart, crash or power loss event, the data stored in the snapshot file persists and can be used by the caching system 100 after starting up. The snapshot file 147 may be stored locally on the caching system, for example, on mass storage 115, or can be stored on the network, for example, on an external cache 145. While operating, the caching system 100 can continuously store, in a snapshot file, a portion of the cached data in the caching structure 102 deemed most likely to be reused (e.g., the most recently accessed data). In one embodiment, the snapshot file is significantly smaller than the size of the caching structure 102, for example, replicating only 1-5% of the data in the caching structure 102. In some cases, the snapshot file may be greater than 5%, such as 5%-10%. In some cases, the snapshot file may be smaller than 1%. In one embodiment, the size of the snapshot file is based in part on the rate differential between throughput of the memory device (e.g., RAM or processor cache) on which the caching structure 102 is stored and the memory device (e.g., mass storage or network storage) on which the snapshot file is stored. As discussed above, memory used for caching is generally faster than mass storage devices, thus writes/reads are generally faster on the caching memory than the mass storage device. For example, in the time it takes to write a first amount of data to a hard drive, a much greater amount may have already changed in the cache memory. Thus, having a smaller snapshot file relative to the cache structure 102 size can be beneficial for freshness of the data.

By persisting only a small portion of the cached data, the freshness of the persisted data is increased as the snapshot file can be updated more often. The snapshot file can then be used to restore at least some data into the caching structure in cases where the cached data is lost. For example, in cases of a cold-start or restart, the caching system can load data from the snapshot file into the empty caching structure 102. This can increase the number of cache hits since the cache is repopulated with useful data at startup. If the data in the snapshot is fairly fresh (e.g., if only a small amount of time has passed since the system 100 restarted), then much of the data from the snapshot file may still be useful for generating cache hits.

As will be recognized, the arrangement shown in FIG. 1A represents just one of many possible ways that the caching system 100 may be arranged in a network. For example, the illustrated networks 120a, 120b may be different networks or part of the same network (e.g., the Internet). In one embodiment, the first network 120a is a public network while the second network 120b is a private network or vice versa. For ease of reference, the disclosure generally uses the term "network 120" to refer to either or both networks 120a, 120b.

The client computing devices 125 may include, for example, personal computers (PCs), personal digital assistants (PDAs), cellular telephones, laptops, tablets, e-book readers and other types of devices that support web browsing or otherwise access online computing services. For example, the client devices may be used by users to connect to various types of web sites, such as sites related to shopping, news, organizations, sports, games, product reviews or the like. These web sites may be hosted by various web servers 130.

As discussed above, data can be primarily stored and cached from a variety of data repositories that can be local to components of the caching system 100 or can be on networked or distributed systems. The data repositories may be implemented using any type or types of physical computer storage. For example, such data repositories can include magnetic hard drives, solid state drives or memory, optical disc and/or the like. Various data structures can be used to store the data, such as electronic files, databases or other data structure.

FIG. 1B is a block diagram schematically illustrating an embodiment of a distributed services system 150 that utilizes one or more caching systems 100 of FIG. 1A. The distributed services system 150 can include one or more application servers 130 that provide services (e.g., web hosting, storage, etc.) to client devices 125. In some embodiments, application processes 107 operating on the application servers 130 utilize the one or more caching systems 100 to store and retrieve cached data.

In one embodiment, each application server 130 has a client application or caching interface to the one or more caching systems 100 (100a-100c) that allows the application processes to interact with the caching systems 100. For example, the application processes can issue commands to one of the caching systems 100 to store or retrieve data.

As discussed above, multiple levels of memory types can be used by the caching structure 102. This multi-level architecture can also be extended to the caching systems 100. For example, the distributed services system 150 can have multi-levels of application caches. In one example two-level implementation, the application servers 130 first attempt to retrieve cached data from a primary caching system (e.g., caching system 100a). However, if the primary caching system does not have the data, the primary caching system can try to retrieve the data from secondary caching systems (e.g., caching systems 100b, 100c) that have more total cache size, in aggregate, than the primary caching system.

Many variations of the caching system 100 are possible. For example, FIG. 1A illustrates an example caching system 100 where the application processes 107 and the caching structure 102 are on the same computing system. In another example, FIG. 1B illustrates example caching systems 100 where the application processes 107 operate on separate computing systems. In yet another example, the caching system 100 and the application servers 130 may be different virtual machine instances operating on the same physical computing system.

Figure 2:
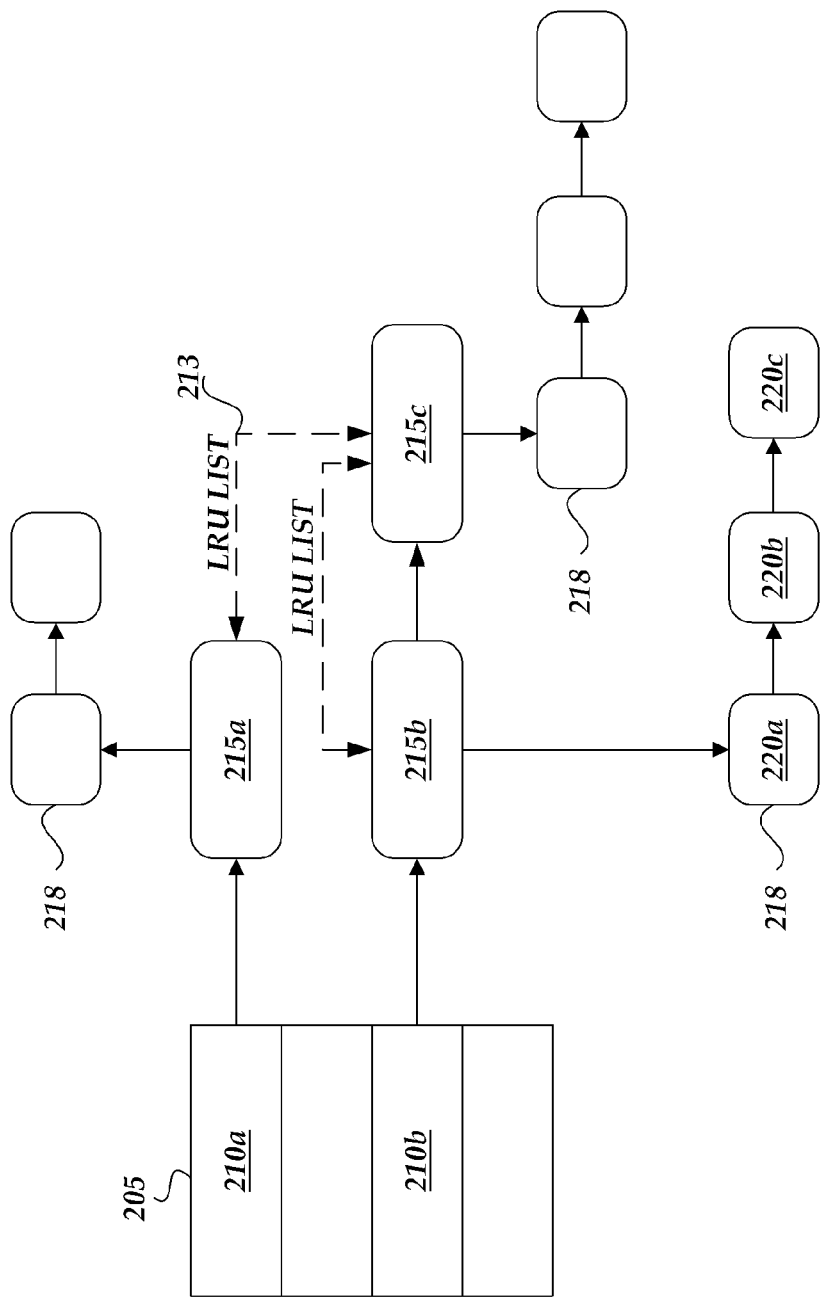
FIG. 2 schematically illustrates an embodiment of the caching structure of FIG. 1A.

FIG. 2 schematically illustrates an embodiment of the caching structure 102 of FIG. 1. In one embodiment, three data-structures types are used by the caching structure:

1) A hash-table 205 for tracking key/value pairs;
 2) A doubly-linked list 213 that reflects the access order; and
 3) A linked list 218 of fixed size storage blocks.

A hash table or hash map is a data structure that uses a hash function to map identifying values, known as keys (e.g., a person's name), to their associated values (e.g., their telephone number). Thus, a hash table can implement an associative array. A hash function is used to transform the key into an index (the hash) of an array element (the slot or bucket) where the corresponding value is to be sought.

Ideally, the hash function maps each possible key to a unique slot index, but this ideal is rarely achievable in practice. Instead, most hash table designs assume that hash collisions—different keys that map to the same hash value—will occur and must be accommodated in some way.

In a well-dimensioned hash table, the average cost (number of instructions) for each lookup is independent of the number of elements stored in the table. Many hash table designs also allow arbitrary insertions and deletions of key-value pairs, at a constant average.

In many situations, hash tables can be more efficient than search trees or any other table lookup structures. For this reason, hash tables can be used in many kinds of computer software, particularly for associative arrays, database indexing, caches and sets.

In one embodiment, the hash table 205 is an open-addressing hash table. Open addressing, sometimes known as closed hashing, is a method of collision resolution in hash tables where a hash collision is resolved by probing or searching through alternate locations in the array until either the target record is found or an unused array slot is found, which indicates that there is no such key in the table. In one embodiment, the hash table 205 is configured to utilize probing to resolve collisions. Examples of probing algorithms include linear probing, quadratic probing and double hashing. In linear probing, the interval between probes is fixed (e.g., an interval of 1). In quadratic probing, the interval between probes is increased by adding the successive outputs of a quadratic polynomial to the starting value given by the original hash computation. In double hashing, the interval between probes is computed by another hash function.

In one embodiment, when a new entry is to be inserted into the hash table 205, the buckets (e.g., 210a, 210b) are examined, starting with the hashed-to slot calculated by the hashing function and proceeding in some probe sequence, determined by the probing algorithm, until an unoccupied slot is found. When searching for an entry, the buckets can be scanned in the same sequence, until either the target record is found or an unused array slot is found, which indicates that there is no such key in the table (e.g., during a cache miss).

In one embodiment, buckets 210a, 210b in the hash table 205 point or refer, respectively, to lists of one or more collision nodes 215a, 215b, 215c. Each collision node list can have varying numbers of collision nodes. Multiple collision nodes (e.g., 215b and 215c) indicate that more than one key is mapped to that particular bucket (e.g., 210b).

In one embodiment, a collision node 215b points or refers to a linked list 218 of fixed size storage blocks 220a, 220b, 220c used for the storage of the values associated with the keys. Each linked list can have varying numbers of storage blocks based on the size of the data being store.

The caching structure 102 can implement various cache algorithms (also called replacement algorithms or replacement policies), which are optimizing instructions that a computer program or a hardware-maintained structure can follow to manage a cache of information stored on the computer. When the cache is full, the algorithm chooses which items to discard to make room for the new data items.

In one embodiment, the caching structure 102 uses the least recently used (LRU) algorithm as its cache algorithm. In one embodiment, the system 100 uses a doubly-linked list 213 to reflect the access order for data stored in the cache. The caching structure can maintain an LRU list (or other data structure for maintaining prioritization order data) pointing to the least recently used data items. In the example illustrated in FIG. 2, the doubly-linked list 213 is reflective of the least recently used items, where an element closer to the front of the list has been accessed more recently than an element further away from the front of the list. For example, assuming 215a is the front of the LRU list, then 215c is next and 215b is last on the LRU list. As the example LRU list reflects the access order, the LRU list indicates that data value associated with collision node 215a was the most recently accessed element, while the data value associated with 215b was the least recently accessed element. By maintaining such a property, the doubly-linked lists 213 allow least recently used elements to be more easily identified (e.g., by going to the last collision node of the list 213, in this example node 215b) and removed from the cache, if needed. In some embodiments, the system 100 modifies the doubly-linked list 213 after a cache access to maintain the proper order. For example, referring to the above example LRU list, if the next cache request is for data associated with node 215b, then 215b is moved to the front of the LRU list and node 215c is now at the end of the list.

In a system that implements an LRU algorithm, the system discards the least recently used items first. The LRU algorithm requires keeping track of what was used when. There are various LRU algorithms that can be used by the caching structure 102, such as 2Q and LRU/K.

In some embodiments, the caching structure 102 can use other cache algorithms to determine which data items to discard from the cache. Some example cache algorithms include: most recently used (MRU), pseudo-LRU, random replacement, segmented LRU (SLRU), 2-way set associative, direct-mapped cache, adaptive replacement cache, clock with adaptive replacement and multi queue caching.

The caching structure 102 may be modified from the example given in FIG. 2 depending on the various factors, such as the cache algorithm used. For example, the doubly-linked list 213 may be an MRU list. In another example, no list may be needed if the selected cache algorithm does not require tracking the access order. For example, in one embodiment, random replacement is used and no doubly-linked list 213 indicative of access order is maintained.

In some embodiments, the caching system 100 utilizes a snapshot file 147 or other limited size data structure to store a portion of the data stored in the caching structure 102. The snapshot file 147 may be stored locally on the caching system, for example, on mass storage 115, or can be stored on the network, for example, on an external cache 145. While operating, the caching system 100 can continuously store, in a snapshot file, a portion of the cached data in the caching structure 102 deemed most likely to be reused (e.g., the most recently accessed data). In one embodiment, the snapshot file is significantly smaller than the size of the caching structure 102, for example, replicating only 1-5% of the data in the caching structure 102. By persisting only a small portion of the cached data, the freshness of the persisted data is increased as the snapshot file can be updated more often. The snapshot file can then be used to restore at least some data into the caching structure in cases where the cached data is lost. For example, in cases of a cold-start or restart, the caching system can load data from the snapshot file into the empty caching structure 102. This can increase the number of cache hits since the cache is repopulated with useful data at startup. If the data in the snapshot is fairly fresh (e.g., if only a small amount of time has passed since the system 100 restarted), then much of the data from the snapshot file may still be useful for generating cache hits.

Figure 3A:
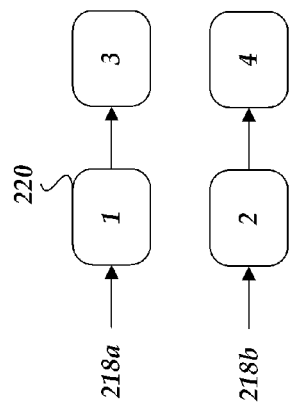
FIG. 3A schematically illustrates two example linked lists of storage blocks.

FIG. 3A schematically illustrates two example linked lists 218a, 218b of storage blocks 220. The first linked list 218a includes two storage blocks, marked "1" and "3" to represent the time during which the data in each block is needed by a processor 117. "1" is needed at time t=1 and "3" is needed at time t=3. The second linked list 218b includes two storage blocks marked "2" and "4," needed at time t=2 and t=4. In one embodiment, the data stored in the blocks is used by an application process 107.

Figure 3B:
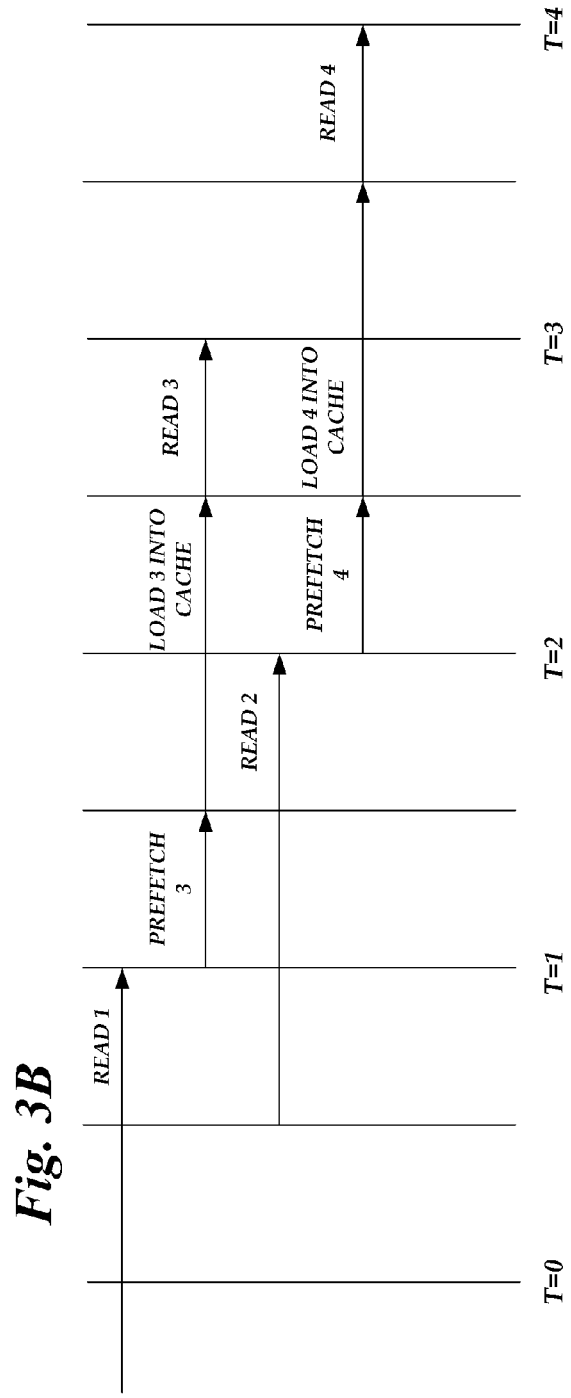
FIG. 3B schematically illustrates an embodiment of a process for pre-fetching data from storage blocks that can be implemented by the caching system of FIG. 1A.

FIG. 3B schematically illustrates an embodiment of a process for pre-fetching data from storage blocks that can be implemented by the caching system 100 of FIG. 1. By pre-fetching data, the caching system 100 can reduce latency in the cache. An example implementation of the process is discussed below, as applied to the two example linked lists 218a, 218b of FIG. 3A. In this example, it is assumed that reading un-cached data takes time of 1.5, though this technique can be applied for other time values. Generally, un-cached data may be on the primary storage or on a different device on a network. For example, the caching system 100 may be reading data from mass storage or an external cache over the network.

At t=0, the caching system 100 is reading block 1, which began at t=−0.5. At t=0.5, the system begins reading block 2. As both block 1 and block 2 have not previously been loaded onto the cache, the reads take longer to accomplish. For example, the block 1 and block 2 may be stored on an external cache or on mass storage 115.

At t=1, the caching system has completed reading block 1, which is now available to be used by the processor 117 or an application process 107 running on the processor 117. As block 1 is linked to block 3, the system can determine that block 3 will be needed next and the caching system 100 can begin prefetching block 3. At t=1.5, prefetching of block 3 completes and the system begins loading block 3 into the cache.

At t=2, the caching system completes reading block 2, which is now available to be used. Further, the system can determine that block 4 will be needed next since block 2 has been read and block 2 is linked to block 4. The caching system 100 can then begin prefetching block 4.

At t=2.5, block 3 has been loaded into the cache. The system 100 can then begin reading block 3 from the cache so that it is available at t=3. As block 3 is being read from the cache rather than from the data source, block 3 can be accessed much faster. In this example, it only takes time of 0.5 to read from cache, which completed by t=3. Further, block 4 has been prefetched from the data source and is now loaded into the cache.

At t=3, block 3 is available to be use. At t=3.5, block 4 is read from cache. As the read is performed from the cache, the read completes faster. At t=4, block 4 is finished being read from cache and is available to be used by the processor 117.

As can be seen from the above example, by prefetching data linked to a current storage block being requested (e.g., block 1 or block 2) into the cache, the subsequent data can be more quickly accessed, reducing latency.

Figure 4:
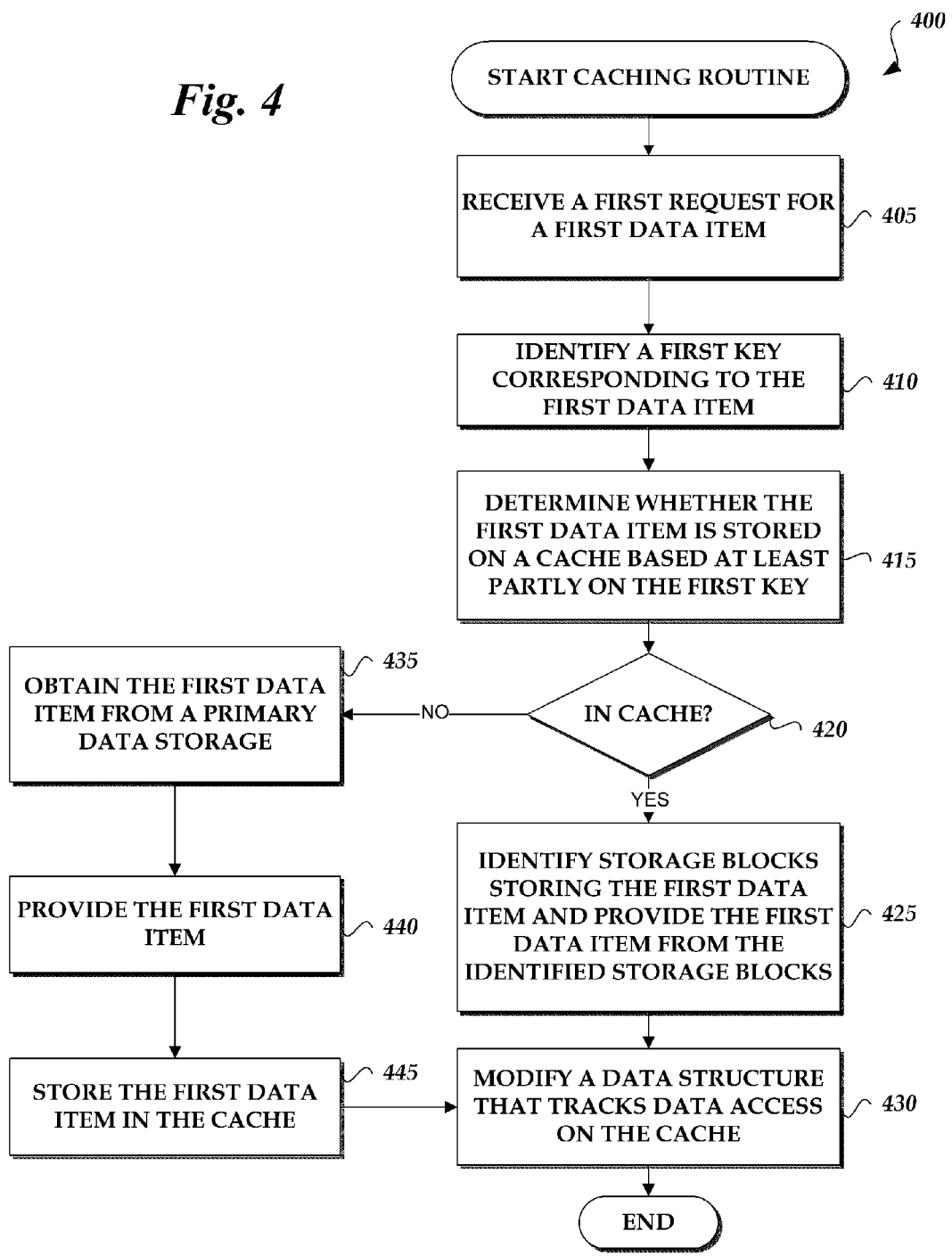
FIG. 4 schematically illustrates a logical flow diagram for a process to access data in the caching structure of FIG. 1A.

FIG. 4 schematically illustrates a logical flow diagram for a process 400 to access data in the caching structure 102 of FIG. 1. In some implementations, the process is performed by embodiments of the caching system 100 described with reference to FIG. 1 or by another component of the system 100, such as the caching structure 102. For ease of explanation, the following describes the process as performed by the caching system 100. The process is discussed in the context of an example scenario that is intended to illustrate, but not to limit, various aspects of the caching system 100.

Beginning at block 405, the caching system 100 receives a first request for a first data item. For example, the first request may come from a client device 125, with the request transmitted over the network 120a and received by a networking interface of the caching system 100. One example transaction is a web page or web content request, where a browser on the client device 125 is requesting a web page and the caching system 100 provides caching for a web server. The web server, after receiving the request, can request that the caching system 100 provide the first data item. Other types of transactions may also be handled by the caching system 100. As discussed above, caching data items can speed up a wide variety of data transactions.

At block 410, the caching system 100 identifies a first key corresponding to the first data item. For example, the caching system 100 can obtain or derive some type of identifier (e.g., session ID, user ID, URL, filename, etc.,) from the first request.

At block 415, the caching system 100 determines whether the first data item is stored on a cache based at least partly on the first key. In one embodiment, the cache implements the caching structure 102 described in FIG. 2, including a first data structure configured to track the access order of data in the cache (e.g., a doubly-linked list 213, a linked list or the like), a second data structure (e.g., a hash table 205, b-tree, b+ tree or the like) configured to map key/value pairs, each key/value pair comprising a key portion and a value portion, and a third data structure (e.g., a linked list 218 or doubly-linked list) configured to track storage blocks for storing data.

In one embodiment, the caching structure 102 stores data using fixed size storage blocks. In one embodiment, the storage blocks are between 64-128 bytes, 64-256 bytes, 32-1024 bytes or other size ranges. In one embodiment the storage blocks are no more than 256 bytes. In some embodiments, all the storage blocks are a single, uniform size.

In one embodiment, the cache includes a hash table 205 and the caching system 100 can apply a hash function to the first key to determine which bucket in the hash table 205 the key maps to. The cache system 100 can then search the contents of the hash bucket to determine if the first data item is stored on the cache.

At block 420, based on the determination, the system 100 proceeds to block 425 or block 435. In some cases, the first data item is in the cache (e.g., a cache hit) and the system proceeds to block 425. In some cases, the first data item is not in the cache (e.g., a cache miss) and the system proceeds to block 435.

At bock 425, the caching system 100 identifies storage blocks storing the first data item and provides the first data item from the identified storage blocks. In one embodiment, the caching system 100 accesses a linked list 218 identified by the hash bucket in the hash table 205. In one embodiment, the linked list 218 identifies the location of the storage blocks in the cache in which the first data item is stored. The caching system 100 can then read the storage blocks from the cache and obtain the first data item. The caching system 100 can then provide the first data item to the source of the request (e.g., a client device, a web server, another service on same computer or the like).

At block 430, the caching system 100 modifies a data structure that tracks the data access on the cache, such as the first data structure described above. For example, if the first data structure identifies the least recently or most recently used data items, the caching system 100 can update the first data structure to reflect that the first data item has just been accessed. In one embodiment where the first data structure is a list or doubly-linked list, the system 100 can rearrange the list so that the least used item or the most used item is at the beginning or at the end of the list (e.g., depending on whether the MRU or LRU algorithm is used). The routine 400 can then end.

Referring back to block 420, when the first data item is not in the cache, the routine 400 proceeds to block 435. At block 435, the system obtains the first data item from a primary data storage device. In some cases, the primary data storage may be a mass storage device on the same computing system or computer as the caching system 100. In some cases, the primary data storage may be a storage device located on the network. For example, the primary data storage may be part of an external database or cache.

At block 440, the caching system 100 provides the first data item. For example, the caching system 100 can provide the first data item to the source of the request (e.g., a client device, a web server, another service on same computer or the like).

At block 445, the caching system 100 stores the first data item in the cache. In some cases, the cache may be full and the caching system 100 identifies storage blocks in the cache that can be replaced with the first data item. In one embodiment, the system 100 refers to the first data structure, described above, and identifies storage blocks containing replaceable data. For example, first data structure may identify the least recently used blocks and the system 100 can select those blocks for replacement. As discussed above, may different cache algorithms can be used to identify which storage blocks on the cache to replace. The routine 400 can then proceed back to block 430 and perform the functions described above for block 430. The routine 400 can then end.

Multi-Lock Cache Embodiments

Figure 5:
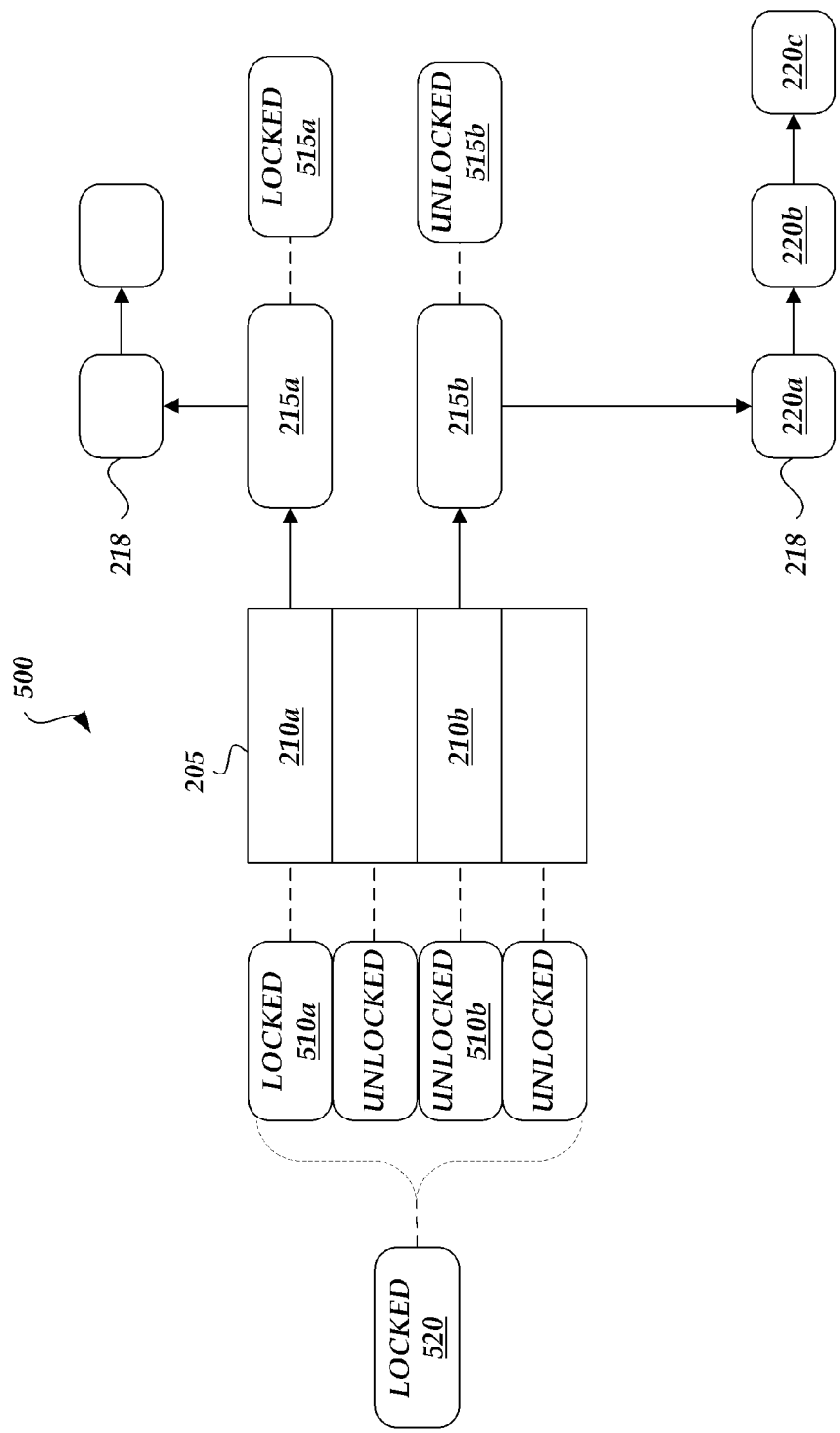
FIG. 5 schematically illustrates another embodiment of the caching structure of FIG. 1A that includes multiple locks.

FIG. 5 schematically illustrates another embodiment 500 of the caching structure of FIG. 1A that includes multiple locks 510. For example, there may be a bucket lock 510a, 510b (also referred to as lock 510) for each bucket 210, a node lock 515a, 515b (also referred to as lock 515) for each collision node, and a region lock 520 for groups of buckets or other grouping of entries. In other examples, there may be multiple instances of only a single type of lock (e.g., per collision node locks) in the caching structure 500. In some embodiments, there are multiple lock types in the caching structure. In one embodiment, an entry is associated with multiple lock types. For example, one entry may be associated with a region lock 520, a bucket lock 510a and/or a node lock 515a. As described in FIG. 2, in one embodiment, the caching structure 500 uses a hash-table 205 for tracking key/value pairs, a doubly-linked list 213 that reflects the access order and a linked list 218 of fixed size storage blocks for storing data associated with an entry. In other embodiments, different data structures can be used, as described above.

In some embodiments, locks are used as a synchronization mechanism for enforcing limits on access to a resource in an environment where there are many threads of execution. A lock can be used to enforce a mutual exclusion concurrency control policy. Generally, locks are advisory locks, where each thread cooperates by acquiring the lock before accessing the corresponding data. Some implementations may use mandatory locks, where attempting unauthorized access to a locked resource will force an exception in the entity attempting to make the access.

Many different types of locks can be used. One type of lock is a semaphore, such a binary semaphore or counting semaphore. A semaphore is a variable or abstract data type that provides an abstraction for controlling access by multiple processes to a common resource in a parallel programming or multi user environment. Another type of lock is a spinlock, where the thread simply waits ("spins") until the lock becomes available. Spinlocks are efficient if threads are only likely to be blocked for a short period of time, as it avoids the overhead of operating system process rescheduling. However, spinlocks can be inefficient if the lock is held for a long period of time, as processor time is wasted spinning Some locks can function both in a shared mode (e.g., as a read lock) and an exclusive mode (e.g., as a write lock). In some cases, the shared mode and the exclusive mode may be provided by using separate read locks and write locks. Locks can be implemented in hardware, software, or a combination of both.

While some caches may use a single lock, the caching structure 500 embodiment of FIG. 5 uses a read/write lock (e.g., a spinlock) per entry or for a small group of entries (e.g., region lock 520), thereby allowing smaller portions of the cache to be locked during cache updates (e.g., during storage block eviction). In some embodiments, there may be one lock for 1, 2, 3, or 4 entries. In some embodiments, each lock is associated with a group of 5 or more entries. For example, a bucket lock may be associated with a bucket having multiple collision nodes for multiple entries, wherein each collision node is associated with a node lock. As only small portions of the cache are locked at any given time, contention between threads, particularly in multi-processor implementations, will likely be reduced. For example, if different threads are trying to update different entries in the cache 500, the threads can proceed with updating the cache concurrently.

In one embodiment, the caching structure 500 has one lock (e.g., node locks 515a, 515b) per entry. However, other embodiments may use multiple lock types per entry or may only have locks for groups of entries. During an update to cache entry 210, such as a data update or an eviction of the cached data (e.g., 220a-c), a first lock 510a associated with a first entry 210a is obtained by a first process (or first processor). As other entries have separate locks, other processes can also obtain locks on the other entries and update those entries concurrently or at least partially concurrently with the updates performed by the first process. For example, a second process (or second processor) can still obtain a second lock 510b associated with entry 210b, even if the first lock 510 is being used.

In some embodiments, the caching structure 500 only uses locks on writes and no locks are used during reads. In other embodiments, the caching structure 500 mainly uses shared locks (sometimes referred to as read locks) with only limited use of exclusive locks (sometimes referred to as write locks). By using shared locks or not using locks on reads, multiple threads or processes can access the same entry concurrently for reading. This can be useful in environments where the same piece of data is accessed often. For example, in a web server application that hosts a web site, the front page of the website is accessed very often. The front page can be stored in one or more entries of the cache. If shared locks are used, then multiple threads (serving multiple users concurrently accessing the front page) can obtain the front page at the same time.

In one embodiment with no locking during reads, the caching structure 500 uses counters or other indicators of use for each entry. When a process is reading from a first entry, the counter is incremented (e.g., count=1), indicating the first entry is being read. If another process starts reading the first entry, the counter is incremented again (e.g., count=2). If a cache update operation begins for the first entry, the write process can first check that the counter is zero or otherwise indicating that no users are reading the entry. If no other threads are reading the entry, then the update can proceed. In one embodiment, the update process includes disassociating a collision node 215b from an entry 210b, so that additional processes attempting read from the storage blocks 220a-c associated with the collision node 215b are unable to find the collision node. Otherwise, if other threads are reading the entry, then the update process can wait until the other threads are finished reading from the entry.

In one embodiment, the caching structure 500 allows storage block evictions to begin while storage blocks are still being read, in order to allow greater concurrency and reduce contention or waiting. In one implementation, the caching structure 500 moves storage blocks 220a-c that are still being read to a temporary list while disassociating the storage blocks 220a-c and/or associated collision node 215b with the entry 210b. Thus, processes already reading from the storage blocks 220a-c can finish, while new processes are unable to locate the storage blocks 220a-c. Once all the processes are finished reading, the storage blocks 220a-c can be moved from the temporary list to a free-list of storage blocks available to be written on with new cached data.

Figure 6:
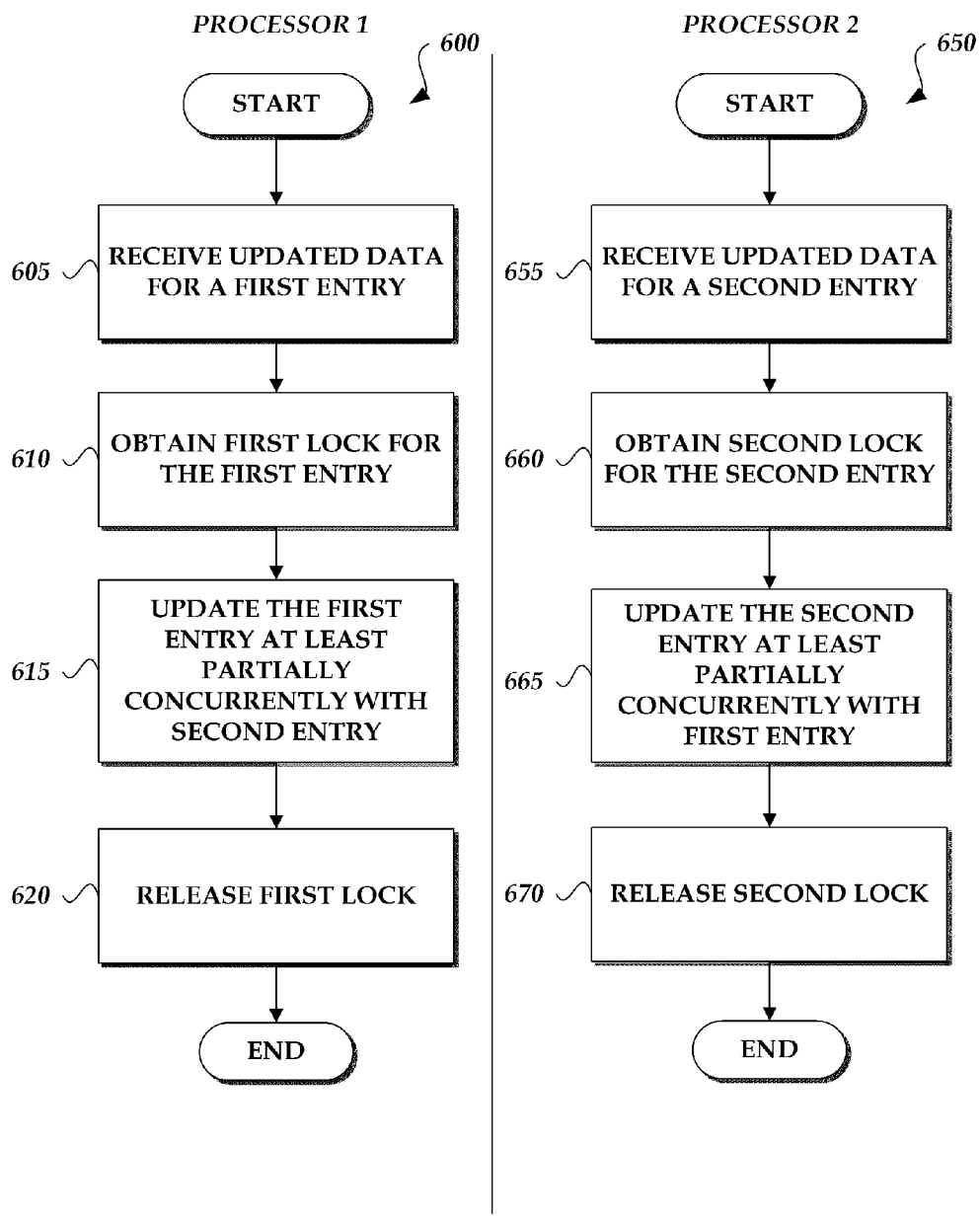
FIG. 6 schematically illustrates logical flow diagrams for a multiprocessor or multi-threaded system to access data in the caching structure of FIG. 5.

FIG. 6 schematically illustrates logical flow diagrams for a multiprocessor or multi-threaded system to access data in the caching structure 500 of FIG. 5. In some implementations, the processes 600, 650 are performed by embodiments of the caching system 100 described with reference to FIG. 1A or 1B or by another component of the system 100, such as the caching structure 500. For ease of explanation, the following describes the processes as performed by a first processor and a second processor of the same system (e.g., the caching system 100). The processes may also be performed by a first thread and a second thread (e.g., in a single or multi-processor system). The processes 600, 650 are discussed in the context of an example scenario that is intended to illustrate, but not to limit, various aspects of the caching system 100.

Beginning with the first process 600, starting at block 605 the first processor receives updated data for a first entry in the cache 500. In some cases, the update may involve a data update in the data stored in the first entry. In other cases, the update may involve an eviction of the data entry from the cache. For example, when new data is being read into the cache and the cache has less availabe space than the size of the new data, then existing entries (e.g., the least recently used entries) are evicted from the cache to free up space for the new data.

At block 610, the first processor obtains a first lock for the first entry. In some cases, there may be other processes reading from the first entry. In such cases, the first processer can wait until the other process completes reading from the first entry and then obtain the lock afterwards.

In some embodiments, multiple levels of locks are used and the first processor obtains multiple locks for the first entry. For example, the first processor may obtain a first group lock (e.g., a bucket lock) for a group of entries (e.g., collision nodes and associated storage blocks) that includes at least a first entry and a second entry, and then also obtain a first entry lock (e.g., a node lock) for the first entry. The first processor can then identify first storage nodes associated with the first entry. Subsequent to identifying the first storage nodes, the first processor can then release the first group lock while retaining the first entry lock for the first entry so that the first processor can perform additional operations on the first entry (e.g., read or write the storage blocks associated with the first entry).

In some cases, a lock may be acquired for particular functions (e.g., read or write). For example, a read lock may prevent other processors from writing over an entry without preventing other processors from reading the entry. In another example, a write lock may prevent writing and reading from the entry, as the entry is changing and allowing other processors to read and/or write the entry could result in bad data.

In one such embodiment, when adding an entry into the hash table 205, the first processor obtains a read bucket lock 510a on a bucket 210 of the hash table and a read node lock 515a on a collision node 215 to prevent modification of data associated with the bucket and/or collision node (e.g., the collision node list or storage blocks 218). The first processor can then determine whether space is available for the entry and/or whether existing data needs to be evicted to create additional space. After determining whether space is available and possibly identifying data for eviction, the first processor can release the read bucket lock 510a while retaining the read node lock 515a. At this point, the first processor has identified the target collision node 215a on which to perform further operations, so changes to the collision node list would not affect the first processor's further operations. By releasing the read bucket lock 510a at this point, the caching system 100 enables greater concurrency, as additional processors can perform operations on other collision nodes of the bucket 210a without affecting the target collision node 215, for which the first processor retains the read node lock 515a. In one embodiment, the first processor then upgrades the read node lock 515a to a write node lock 515a to prevent other processors from modifying data associated with the collision node 215a (e.g., the storage node list or the storage nodes 218). The first processor can then perform the operations related to the target collision node 510a, such as evicting existing data, allocating space, saving data into the allocated space, and/or revising pointers (e.g., for the storage block list) in the caching structure 500.

In one embodiment, the first processor performs similar operations to the add entry operations when evicting an entry from the cache to free up space. For example, the first processor can obtain both a bucket lock and a node lock, perform an operation such as updating a collision node list, release the buck lock, and then perform additional operations specific to the collision node, such as freeing storage blocks associated with the collision node. After freeing the node, the first processor can then release the node lock. In one embodiment, the first processor also temporarily obtains an LRU list lock to update the LRU list (e.g., to reflect changes in the priority order) and then releases the LRU list after the change. By holding the LRU list lock for only a limited amount of time, greater concurrency is promoted in the caching system 100.

At block 615, the first processor updates the first entry at least partially concurrently with an update occurring to a second entry in the cache, where the second entry is updated by the second processor. As the first entry and the second entry have separate locks, the cache can be updated concurrently or partially concurrently.

At block 620, the first processor completes the cache update and releases the first lock. Other processes can now obtain the first lock to further update the first entry. In the multi-level lock embodiment described above, the first processor can release the first group lock and the first entry lock. The first group lock may be released at a different time from the first entry lock. For example, as described above, after performing a first operation related to the first entry, the first processor can release the first group lock. The first processor can then subsequently update the first entry and then release the first entry lock. The process 600 can then end.

Next, with the second process 650, starting at block 655 the second processor receives updated data for a second entry in the cache 500. In some cases, the update may involve a data update in the data stored in the second entry. In other cases, the update may involve an eviction of the data entry from the cache.

At block 660, the second processor obtains a second lock for the second entry. In some cases, there may be other processes reading from the second entry. In such cases, the second processor can wait until the other process completes reading from the second entry and then obtain the lock afterwards.

In some embodiments, multiple levels of locks are used and the second processor obtains multiple locks for the second entry. For example, the second processor may obtain the first group lock and then also obtain a second entry lock for the second entry. In some cases, the second processor may have to wait until the first processor releases the first group lock before being able to obtain the first group lock. In other cases, the first processor may have obtained the first group lock as a shared lock and the second processor can also obtain the first group lock as a shared lock, without waiting for the first processor to release the first group lock. In one embodiment, the first processor and the second processor can share the first group lock concurrently. The second processor can then identify second storage nodes associated with the second entry. Subsequent to identifying the second storage nodes, the second processor can then release the first group lock while retaining the second entry lock for the second entry so that the second processor can perform additional operations on the second entry (e.g., read or write the storage blocks associated with the second entry). In some embodiments, the second processor upgrades or otherwise converts the second entry lock to an exclusive lock prior to performing a write or other update on the storage blocks associated with the second entry. For example, the second entry lock may be able to function as both a shared lock and an exclusive lock and the second processor reconfigures the second entry lock as an exclusive lock. In another example, the second entry may have separate locks for providing exclusive and shared access, and the second processor can obtain the separate exclusive lock for the second entry prior to updating the storage block.

In some embodiments, the second processor can perform add entry operations, eviction operations, and LRU list update operations in similar fashion as described for the first processor in the block 610 above. These operations performed by the second processor may at least partially overlap in time with the operations performed by the first processor.

At block 665, the second processor updates the second entry at least partially concurrently with the update occurring to the first entry in the cache, where the first entry is updated by the first processor.

At block 670, the second processor completes the cache update and releases the second lock. Other processes can now obtain the second lock to further update the second entry. In the multi-level lock embodiment described above, the second processor can release the first group lock and the second entry lock. The first group lock may be released at a different time from the second entry lock. For example, as described above, after performing an operation related to the second entry, the second processor can release the first group lock. The second processor can then subsequently update the second entry and then release the second entry lock. The process 650 can then end.

The following is sample pseudo code that may be used to concurrently update a cache using multiple locks, such as described in the processes 600, 650 of FIG. 6.

```
----------------------------------------------------------
******************************************
def get(key):
    lruList.acquireWriteLock( )
    bucket = findBucketForKey(key)
    bucket.acquireReadLock( )
    entry = bucket.findEntry(key)
    entry.acquireReadLock( )
    bucket.releaseReadLock( )
    lruList.moveToBack(entry)
    lruList.releaseLock( )
    value = entry.copyEntry( )
    value.releaseReadLock( )
    lruList.moveToBackLocked(entry)
    entry.releaseReadLock( )
    return value
--------------------------
def put(key, value):
    spaceNeeded = spaceNeededFor(key, value)
    spaceToFree = 0
    bucket = findBucketForKey(key)
    bucket.acquireReadLock( )
    entry = bucket.findEntry(key)
    if entry:
        entry.acquireReadLock( ) # Maintain readLock to
        prevent modifications
        if entry.spaceOccupied( ) < spaceNeeded:
            spaceToFree = spaceNeeded - entry.spaceOccupied( )
        else:
            spaceToFree = 0
    else:
        spaceToFree = spaceNeeded
    bucket.releaseReadLock( )
    # Check against allocator
    if spaceToFree:
        space = evict(spaceToFree)
    else:
        space = [ ]
    entry.upgradeToWriteLock( )
    leftovers = entry.replace(key, value, space)
    entry.releaseWriteLock( )
    # Return leftovers to allocator
--------------------------
def evict(spaceToFree):
    entriesToFree = [ ]
    skipped = false
    lruList.acquireWriteLock( )
    while not skipped:
        for entry in lruList:
            if not entry.bucket.tryAcquireWriteLock( ):
                skipped = true
                continue
            if not entry.tryAcquireWriteLock( ):
                skipped = true
                continue
            entry.bucket.remove(entry)
```

-continued

```
        # Note that the entry lock is not released
        entry.bucket.releaseWriteLock( );
        entriesToFree += entry
        if entry.spaceOccupied( ) > spaceNeeded:
            spaceNeeded = 0
            lruList.releaseWriteLock( )
            break
        spaceNeeded - = entry.spaceOccupied( )
    else:
        lruList.releaseWriteLock( )
        raise InsufficientSpaceError
    if spaceNeeded == 0:
        lruList.releaseWriteLock( )
        return entriesToFree
    skipped = false
****************************************
```

The above pseudo code may be implemented by embodiments of the caching system 100 described with reference to FIG. 1A or 1B or by another component of the system 100. For example, the operations corresponding to the pseudo code may be performed by a first processor and a second processor of the same system (e.g., the caching system 100). Such operations may also be performed by a first thread and a second thread (e.g., in a single or multi-processor system).

Snapshot Embodiments

Figure 7:
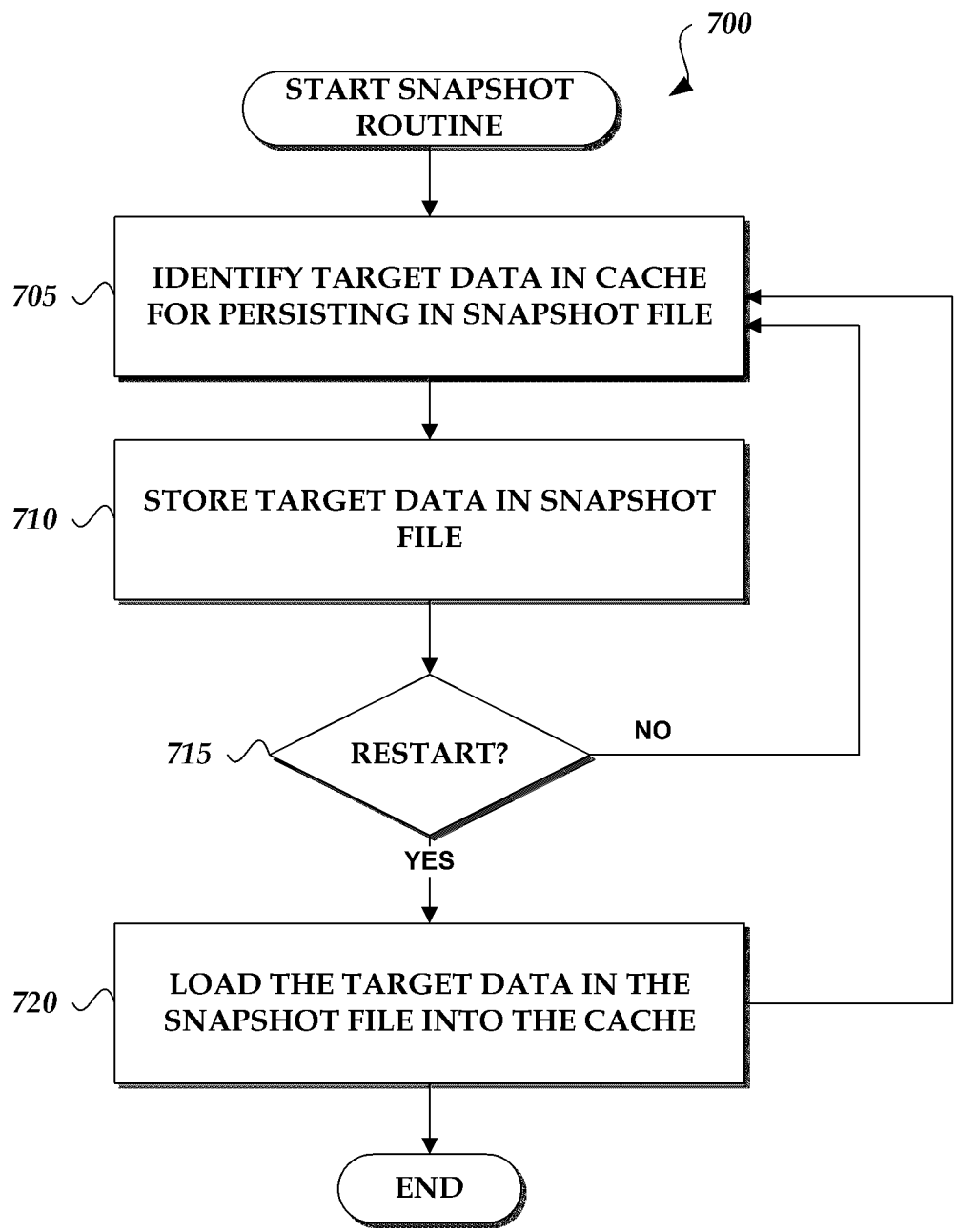
FIG. 7 schematically illustrates a logical flow diagram for a snapshot routine for an embodiment of the caching system that utilizes a snapshot file.

FIG. 7 schematically illustrates a logical flow diagram for a snapshot routine 700 for an embodiment of the caching system 100 that utilizes a snapshot file 147. In some implementations, the routine is performed by embodiments of the caching system 100 described with reference to FIG. 1A or 1B or by another component of the system 100, such as the processor 117. For ease of explanation, the following describes the routine as performed by the caching system 100. The routine 700 may be performed continuously, periodically or intermittently by the caching system 100. In some cases, the routine 700 may be triggered by a particular threshold being reached (e.g., by an entry age or by a timer) or a particular event occurring (e.g., operating system startup or time). The routine is discussed in the context of an example scenario that is intended to illustrate, but not to limit, various aspects of the caching system 100.

Starting at block 705, the caching system 100 identifies target data in the cache for persisting in the snapshot file. During operation of the caching system 100, data is being written into and out of the cache 102, with the contents of the cache changing depending on the data being requested from the cache. In some embodiments, the system 100 determines that the data is unexpired data before storing the data in the snapshot file, to ensure that the stored data is "fresh." For example, the system 100 may check the age of the data or check if more recent data has been saved on another caching system 100 or on the primary storage. In one embodiment, caching system 100 identifies the target data based in part on the doubly-linked list 213 of FIG. 2 (or another data structure type) that is reflective of the access order in the cache 102. For example, as described above, the doubly-linked list can be configured such that elements closer to the front of the list have been accessed more recently. In one implementation, the caching system can go down the list 213, starting from the front, and read data to be placed into the snapshot file. The system can continue until a target data amount of data is reached for the snapshot file. For example, if the snapshot file target size is 5% (or 1%, 10% or other value) of the cache, then once that target size is reached, the system 100 can begin reading the front of the list 213 again. In one embodiment, the system 100 continues down the list 213 until a time to live (TTL) or other indication of age for an entry or group of entries stored in the snapshot file crosses a particular threshold. For example, if the TTL for a certain percentage of entries is above a threshold value that indicates data staleness, the system 100 can then begin reading again from the beginning of the list 213. In another example, the system 100 can continue reading until the TTL or age of the oldest entry in the snapshot file reaches a particular threshold. As described above, in one embodiment, the list 213 is being updated during cache accesses, with the latest accessed data being placed by the system to the front of the list 213. In such an embodiment, when the system 100 repeats reading the list 213, the system 100 captures the most recently accessed data in the snapshot file during each iteration.

The following described one example implementation for a process for traversing the list 213 described in reference to the caching structure of FIG. 2. First, the system 100 reads a first entry in the LRU list 213 and acquires a read lock on a hash table bucket 210a referenced by the list. The system 100 then writes data associated with that entry (e.g., blocks 218 referenced by collision node 215a) to mass storage 115 or other persistent storage. While writing the data, if another process attempts to add data to hash bucket 210a, the system 100 can create a new entry in a temporary location so that the hash bucket does not change during the write operation. Similarly, if another process attempts to read data from hash bucket 210a, the system 100 can first check the temporary location to account for any newly added data to the hash bucket. Once writing the data is complete, the system 100 can merge temporary entries stored in the temporary location with the main cache. The system 100 can then advance to the next hash-table bucket referenced in the LRU list and repeat the process, for example, until the target data amount is saved to the snapshot file.

As will be apparent, other types of algorithms can be used to identify target data in the cache for persisting in the snapshot file. In one embodiment, the system 100 attempts to store the data that is deemed most valuable. In some embodiments, a deterministic evaluation algorithm (e.g., LRU, MRU, other eviction or replacement algorithms, etc.) determines which data is deemed most valuable. In some cases the data identified as most valuable is the data most likely to be reused. As described above, some cache implementations assume that the most recently accessed data is the data most likely to be reused. Other cache implementations assume that the most accessed or used data, based on historical access data, is most likely to be reused. Other techniques known in the art can also be used to predict or estimate which data is most likely to be reused. Such techniques are not necessarily accurate all the time, and some techniques may work better with certain access patterns than with others.

Referring back to FIG. 7, at block 710, the caching system 100 stores the target data in the snapshot file 147. In some embodiments, the snapshot file is stored in some form of persistent storage (e.g., mass storage 115, network storage, etc.) so that, even in case of a restart, crash or power loss event of the system 100, the data stored in the snapshot file persists and can be used by the caching system 100 after starting up.

At block 715, the caching system 100 determines if a restart event occurs. For example, hardware and/or software of the caching system can fail such that the system 100 is forced to restart. If the caching system 100 detects that a startup just occurred or is currently occurring, the routine 700 can proceed to block 720. If no restart event occurs, the routine 700 can proceed to block 705 and continue updating the snapshot file.

At block 720, the caching system 720, in response to detecting a restart event, loads the target data stored in the snapshot file in the cache 102. Loading the cache at startup can increase the number of cache hits since the cache is repopulated with useful data. If the data in the snapshot is fairly fresh (e.g., if only a small amount of time has passed since the system 100 restarted), then much of the data from the snapshot file may still be useful for generating cache hits. The routine 700 can then end or the routine may proceed back to block 705 to continue updating the snapshot file.

Additional Embodiments

Many variations of the caching system 100 are possible. For example, while the caching system 100 may operate on a single computing device (e.g., a server or other computer) or on a computing system with multiple computing devices. Other variations of the caching system 100 are also possible. For example, different data structures can be used instead of or in addition to the data structures described above. For example, rather than a hash table, the caching system 100 may use a b-tree, b+ tree, binary search tree, skip list or other data structure.

As described above, the caching system 100 can be implemented with one or more physical servers or other computing machines, such as several computing machines interconnected via a network. Thus, each of the components depicted in the caching system 100 can include hardware and/or software for performing various features. In one embodiment, the caching system 100 is implemented on a computing system that hosts a web site or collection of web sites that the system 100 monitors.

The caching system 100 can include one or more servers for receiving and responding to requests from a network, such as requests to process session records. The one or more servers can include web servers, application servers, database servers, combinations of the same or the like.

The processing of the various components of the caching system 100 can be distributed across multiple machines, networks and other computing resources. The various components of the caching system 100 can also be implemented in one or more virtual machines, rather than in dedicated servers. Likewise, data repositories can include represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

In some embodiments, the caching system 100 may be configured differently than illustrated in the figures above. For example, various functionalities provided by the illustrated modules can be combined, rearranged, added or deleted. In some embodiments, additional or different processors or modules may perform some or all of the functionalities described with reference to the example embodiment illustrated in the figures above. Many implementation variations are possible.

Other types of interactions (additionally or alternatively) between the caching system 100 and the users and/or user systems are possible in addition to those described above. For example, a caching system 100 interaction can be received directly from a user or administrator (e.g., via an interactive console, web browser or other GUI provided by the caching system 100) or from an executing program. In some embodiments, users may interact with the caching system 100 using other types of interfaces and in other ways.

In some embodiments, the caching system 100 and its components are executed or embodied by one or more physical or virtual computing systems. For example, in some embodiments, a server computing system that has components including a central processing unit (CPU), input/output (I/O) components, storage and memory may be used to execute some or all of the components of the caching system 100. The I/O components can include a display, a network connection to the network 105, a computer-readable media drive and other I/O devices (e.g., a keyboard, a mouse, speakers, etc.). In some embodiments, the caching system 100 may be configured differently than described above.

An embodiment of the caching system 100 can be stored as one or more executable program modules in the memory of the server and/or on other types of non-transitory computer-readable storage media, and the caching system 100 can interact with computing assets over the network 105. In one embodiment, the caching system 100 may have additional components or fewer components than described above. For example, the caching system 100 may be built on top of existing software development or testing systems and designed to coordinate the actions of the existing systems.

First Set of Example Embodiments

In an example embodiment, a memory efficient system for caching data, the system comprising: (1) a network interface for receiving requests from client devices over a network, the requests including a first request for a first data item; (2) computer memory for storing a caching structure, the caching structure configured to store data using fixed size storage blocks, the caching structure including: a hash table configured to map key/value pairs, each key/value pair comprising a key portion and a value portion; a doubly linked list that reflects the access order of data in the caching structure; and one or more linked lists of storage blocks for storing data, wherein each key portion references a linked-list of one or more storage blocks; and (3) one or more processors configured to: identify a first key portion corresponding to the first data item; determine storage blocks storing the first data item based at least in part on the first key portion; provide the first data item from the determined storage blocks; and modify the doubly-linked list to reflect access to the first data item.

In another example, the above system, wherein the size of the fixed size storage blocks is selected from a range from 1) a cache line size of the one or more processors to 2) half of a first level cache of the one or more processors.

In an additional example, the above system, wherein a maximum block size of the fixed size storage blocks is no more than a page size of the one or more processors.

In another example, the above system, wherein the one or more processors is configured to identify a first key portion based at least in part on a hashing function. Further, in one example, the above system, wherein the hashing function determines the first key portion based at least in part on a probing algorithm.

In an additional example, the above system, wherein the computer memory comprises processor cache memory.

In another example, the above system, wherein the computer memory comprises random access memory.

In an example embodiment, a method of caching data, the method comprising: receiving a first request for a first data item; determining whether the first data item is stored on a cache configured to store data using fixed size storage blocks; in response to determining that the first data item is not on the cache, obtaining the first data item from a primary data storage device; identifying one or more fixed size storage blocks in the cache for replacement based at least in part on a first data structure that reflects the access order of data in the cache; and storing the obtained first data item in the cache in the identified one or more fixed size storage blocks.

In another example, the above method, wherein the one or more fixed size storage blocks are no more than 256 bytes in size.

In an additional example, the above method, wherein the one or more fixed size storage blocks are one of the following sizes: 32 bytes, 64 bytes, 128 bytes or 256 bytes.

In another example, the above method, wherein the size of the fixed size storage blocks is selected from a range from 1) a cache line size of a processor to 2) half of a first level cache of the processor.

In an additional example, the above method, wherein a maximum block size of the fixed size storage blocks is no more than a page size of the one or more processors.

In another example, the above method, wherein the cache comprises: a hash table configured to map key/value pairs, each key/value pair comprising a key portion and a value portion; and one or more linked lists of storage blocks for storing data, wherein each value portion of key/value pairs stored in the hash table references a linked-list of one or more storage blocks; wherein the first data structure comprises a doubly-linked list that reflects the access order of data in the cache.

In an additional example, the above method further comprising modifying the first data structure to reflect said storing of the obtained first data item in the cache.

In another example, the above method, wherein identifying the one or more fixed size storage blocks in the cache for replacement comprises identifying one or more fixed size storage blocks associated with least recently used data.

In an additional example, the above method, wherein the primary data storage device is a mass storage device located on a same computer as the cache.

In another example, the above method, wherein the primary data storage device is an external cache on a network.

In an additional example, the above method, wherein the primary data storage device is a mass storage device located on a different computer as the cache, the mass storage device accessible via a network.

In another example, the above method, further comprising prefetching data from the determined storage blocks.

In an example embodiment, non-transitory computer storage having stored thereon instructions that, when executed by a computer system, cause the computer system to perform operations comprising: determining whether a first data item is stored on a caching structure configured to store data using fixed size storage blocks, the first data item requested by a first request; in response to determining that the first data item is not in the caching structure, obtaining the first data item from a primary data storage device; and storing the obtained first data item in the caching structure in one or more fixed size storage blocks.

In another example, the above non-transitory computer storage, wherein the one or more fixed size storage blocks are no more than 256 bytes in size.

In an additional example, the above non-transitory computer storage, wherein the size of the fixed size storage blocks is selected from a range from 1) a cache line size of a processor to 2) half of a first level cache of the processor.

In another example, the above non-transitory computer storage, wherein a maximum block size of the fixed size storage blocks is no more than a page size of the one or more processors.

In an additional example, the above non-transitory computer storage, wherein the caching structure further comprises: a first data structure configured to track the access order of data in the caching structure; a second data structure configured to map key/value pairs, each key/value pair comprising a key portion and a value portion; and one or more of a third data structure configured to track storage blocks for storing data. Further, in one example, the above non-transitory computer storage, wherein the first data structure is a doubly-linked list. Additionally, in one example, the above non-transitory computer storage, wherein the second data structure is a hash table. Further, in one example, the above non-transitory computer storage, wherein the third data structure is a linked list of storage blocks. Additionally, in one example, the above non-transitory computer storage, wherein the one or more fixed size storage blocks are selected for replacement based at least in part on a first data structure that reflects the access order of data in the caching structure.

Second Set of Example Embodiments

In an embodiment, a system for updating cached data, the system comprising: (1) computer memory for storing a caching structure, the caching structure including multiple locks and a plurality of entries, each entry stored in one or more storage blocks; (2) a first processor configured to: obtain a first group lock and a first entry lock associated with a first entry in the caching structure, the first group lock controlling access to at least the first entry and a second entry, the first entry lock controlling access to the first entry, wherein the first group lock and the first entry lock are obtained as shared locks; identify first storage nodes associated with the first entry; subsequent to identifying the first storage nodes, release the first group lock while retaining the first entry lock for the first entry; converting the first entry lock into an exclusive lock; updating the first storage nodes associated with the first entry; and subsequent to updating the first storage nodes, releasing the first entry lock; and (3) a second processor configured to: obtain the first group lock and a second entry lock associated with the second entry in the caching structure when updating the second entry, wherein the first group lock and the second entry lock are obtained as shared locks; identify second storage nodes associated with the second entry; subsequent to identifying the second storage nodes, release the first group lock while retaining the second entry lock for the second entry; converting the second entry lock into an exclusive lock; updating the second storage nodes associated with the second entry; and subsequent to updating the second storage nodes, releasing the second entry lock; wherein the first processor updates the first storage nodes associated with the first entry at least partially concurrently with the second processor updating the second storage nodes associated with the second entry.

In another example, the above system, wherein the first group lock, the first entry lock and the second entry lock are spinlocks.

In an additional example, the above system, wherein the caching structure includes an entry lock for each entry in the caching structure.

In another example, the above system, wherein the computer memory comprises processor cache memory.

In an additional example, the above system, wherein the computer memory comprises random access memory.

In an embodiment, a method for updating cached data, the method comprising: receiving updated data for a first entry in a cache, the cache including multiple locks and a plurality of entries stored in the cache; receiving updated data for a second entry in the cache; obtaining, by a first thread, a first group lock and a first entry lock associated with the first entry in the cache, the first group lock controlling access to at least the first entry and the second entry; subsequent to performing a first operation related to the first entry, releasing, by the first thread, the first group lock while retaining the first entry lock; obtaining, by a second thread, the first group lock and a second lock for the second entry in the cache; and updating, by the first thread, the first entry and updating, by the second thread, the second entry, wherein the updating by the first thread and the second thread occur at least partially concurrently.

In another example, the above method, wherein obtaining, by the first thread, the first group lock and the first entry lock comprises obtaining the first group lock and the first entry lock as shared locks. Further in one example, the above method, wherein obtaining, by the second thread, the first group lock and the second entry lock comprises obtaining the first group lock and the second entry lock as shared locks.

In one example, the above method, further comprising: obtaining, by the first thread, a first exclusive lock for the first entry prior to updating the first entry; and obtaining, by the second thread, a second exclusive lock for the second entry prior to updating the second entry. Further in one example, the above method, wherein obtaining the first exclusive lock comprises converting the first entry lock from a shared lock to an exclusive lock. Additionally, in one example, the above method, wherein the first exclusive lock for the first entry is distinct from the first entry lock.

In another example, the above method, further comprising: releasing, by the first thread, the first entry lock subsequent to updating the first entry; and releasing, by the second thread, the second entry lock subsequent to updating the second entry.

In another example, the above method, wherein the first operation related to the first entry comprises identifying first storage nodes associated with the first entry.

In another example, the above method, further comprising, obtaining, by the first thread, a lock on a data structure for maintaining priority order and updating the data structure to reflect the update to the first entry.

In another example, the above method, wherein the first entry lock and second entry lock are spinlocks.

In another example, the above method, wherein the first entry lock and second entry lock are semaphores.

In another example, the above method, wherein the first entry lock is configurable to function as an exclusive lock or a shared lock.

In another example, the above method, wherein the first entry lock functions as a write lock or a read lock.

In another example, the above method, wherein the caching structure includes an entry lock for each entry in the caching structure.

In another example, the above method, wherein the cache comprises: a hash table configured to map key/value pairs, each key/value pair comprising a key portion and a value portion; the first data structure comprising a doubly-linked list that reflects the access order of data in the cache; and one or more linked lists of storage blocks for storing data, wherein each value portion references a linked-list of one or more storage blocks. Further, in one example, the above method, wherein the caching structure includes a bucket lock for each bucket of the hash table.

In another example, the above method, wherein the first thread is operating on a first processor and the second thread is operating on a second processor.

In an embodiment, a non-transitory computer storage having stored thereon instructions that, when executed by a computer system, cause the computer system to perform operations comprising: receiving updated data for a first entry and a second entry in a cache, the cache including multiple locks and a plurality of entries; obtaining, by a first thread, a first group lock and a first entry lock associated with the first entry in the cache, the first group lock controlling access to at least the first entry and the second entry; subsequent to performing a first operation related to the first entry, releasing, by the first thread, the first group lock while retaining the first entry lock; obtaining, by a second thread, the first group lock and a second lock for the second entry in the cache; and updating, by the first thread, the first entry and updating, by the second thread, the second entry, wherein the updating by the first thread and the second thread occur at least partially concurrently.

In another example, the above non-transitory computer storage, wherein obtaining, by the first thread, the first group lock and the first entry lock comprises obtaining the first group lock and the first entry lock as shared locks. Further, in one example, the above non-transitory computer storage, wherein obtaining, by the second thread, the first group lock and the second entry lock comprises obtaining the first group lock and the second entry lock as shared locks.

In another example, the above non-transitory computer storage further comprising: obtaining, by the first thread, a first exclusive lock for the first entry prior to updating the first entry; and obtaining, by the second thread, a second exclusive lock for the second entry prior to updating the second entry.

In an additional example, the above non-transitory computer storage, the operations further comprising: releasing, by the first thread, the first entry lock subsequent to updating the first entry; and releasing, by the second thread, the second entry lock subsequent to updating the second entry.

In another example, the above non-transitory computer storage, wherein the first operation related to the first entry comprises identifying first storage nodes associated with the first entry.

In an additional example, the above non-transitory computer storage, wherein the caching structure includes a lock for a group of entries in the caching structure.

In another example, the above non-transitory computer storage, wherein the caching structure further comprises: a first data structure configured to track the access order of data in the caching structure; a second data structure configured to map key/value pairs, each key/value pair comprising a key portion and a value portion; and one or more of a third data structure configured to track storage blocks for storing data.

In an additional example, the above non-transitory computer storage, wherein the caching structure includes a lock for each entry of the first data structure.

Third Set of Example Embodiments

In an example embodiment, a system for cache recovery, the system comprising: (1) computer memory for storing a caching structure, the caching structure including a plurality of entries for cached data; (2) one or more processors configured to: identify portions of the cached data deemed most valuable based in part on a deterministic evaluation algorithm; store the portions of the cached data in a snapshot file on non-transitory storage; wherein, in response to a restart of the system, the one or more processors are configured to load the portions of the cached data stored in the snapshot file into the caching structure.

In another example, the above system, wherein the one or more processors are configured to identify the portions of the cached data by: accessing a data structure that reflects a prioritization order of cached data in the caching structure; and selecting, based in part on the prioritization order reflected in the data structure, an amount of the cached data that corresponds to a target size for the snapshot file.

In an additional example, the above system, wherein the cached data deemed most valuable are most recently accessed data in the caching structure.

In another example, the above system, wherein the cached data deemed most valuable are most accessed data in the caching structure.

In an additional example, the above system, wherein a total size of the portions of the cached data in the snapshot file is significantly smaller than a total size of the cached data in the caching structure.

In another example, the above system, wherein snapshot file size is determined based in part on a differential between throughput of the computer memory and the non-transitory storage.

In an additional example, the above system, wherein the non-transitory storage is a mass storage device.

In an example embodiment, a method for cache recovery, the method comprising: identifying, by a computing system, portions of cached data in a caching structure deemed most valuable, the caching structure residing in the computing system; storing the identified portions of the cached data in a snapshot file on non-transitory storage; and in response to a restart of the computing system, loading data from the snapshot file into the caching structure.

In another example, the above method, wherein storing the identified portions of the cached data is performed by the computing system when a threshold value is reached.

In an additional example, the above method, wherein storing the identified portions of the cached data is performed continuously by the computing system.

In another example, the above method, wherein storing the identified portions of the cached data is performed by the computing system in response to an event.

In an additional example, the above method, wherein the non-transitory storage is a storage device of the computing system.

In another example, the above method, wherein the non-transitory storage is a storage device of another computing system.

In an additional example, the above method, wherein the caching structure comprises: a hash table configured to map key/value pairs, each key/value pair comprising a key portion and a value portion; a doubly-linked list that reflects a prioritization order of data in the cache; and one or more linked lists of storage blocks for storing data, wherein each value portion references a linked-list of one or more storage blocks.

In another example, the above method, wherein identifying the portions of the cached data comprises: accessing a data structure that reflects the prioritization order of cached data in the caching structure; and selecting, based in part on the prioritization order reflected in the data structure, an amount of the cached data that corresponds to a target size for the snapshot file.

In an additional example, the above method, wherein the cached data deemed valuable are most recently accessed data in the caching structure.

In another example, the above method, wherein the cached data deemed most valuable are most accessed data in the caching structure.

In an additional example, the above method, wherein a total size of the portions of the cached data in the snapshot file is significantly smaller than a total size of the cached data in the caching structure.

In an example embodiment, non-transitory computer storage having stored thereon instructions that, when executed by a computer system, cause the computer system to perform operations comprising: identifying, by a computing system, a subset of cached data in a caching structure, the caching structure residing in the computing system; storing the identified subset of the cached data in a snapshot file; and in response to a restart of the computing system, loading data from the snapshot file into the caching structure.

In another example, the above non-transitory computer storage, wherein the caching structure further comprises: a first data structure configured to track a prioritization order of data in the caching structure; a second data structure configured to map key/value pairs, each key/value pair comprising a key portion and a value portion; and one or more of a third data structure configured to track storage blocks for storing data.

In an additional example, the above non-transitory computer storage, wherein the subset of cached data is no more than 10% of the cached data in the caching structure.

In another example, the above non-transitory computer storage, wherein the subset of cached data is no more than 5% of the cached data in the caching structure.

In an additional example, the above non-transitory computer storage, wherein the subset of cached data comprises most recently accessed data in the caching structure.

In another example, the above non-transitory computer storage, wherein snapshot file is repeatedly updated based in part on a time to live (TTL) of one or more entries stored in the snapshot file.

Each of the processes, methods and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, act, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A system for updating cached data, the system comprising:
   computer memory for storing a caching structure, the caching structure including multiple locks and a plurality of entries, each entry stored in one or more storage blocks;
   a first processor configured to:
      obtain a first group lock and a first entry lock, the first group lock controlling access to at least a first entry and a second entry, the first entry lock controlling access to the first entry, wherein the first group lock and the first entry lock are obtained as shared locks;
      identify first storage nodes associated with the first entry using first associative array value that associates the first storage nodes with the first entry;
      subsequent to identifying the first storage nodes, release the first group lock while retaining the first entry lock for the first entry;
      convert the first entry lock into an exclusive lock;
      disassociate the first storage nodes from the first entry by deleting the first associative array value;
      update the first storage nodes; and
      subsequent to updating the first storage nodes, release the first entry lock; and
   a second processor configured to:
      obtain the first group lock and a second entry lock, the first group lock controlling access to at least the first entry and the second entry after the first processor obtains the first group lock and prior to the first processor releasing the first group lock, the second entry lock controlling access to the second entry, wherein the first group lock and the second entry lock are obtained as shared locks;
      identify second storage nodes associated with the second entry using a second associative array value that associates the second storage nodes with the second entry;
      subsequent to identifying the second storage nodes, release the first group lock while retaining the second entry lock for the second entry;
      convert the second entry lock into an exclusive lock;
      disassociate the second storage nodes from the second entry by deleting the second associative array value;
      update the second storage nodes; and
      subsequent to updating the second storage nodes, release the second entry lock;
   wherein the first processor updates the first storage nodes at least partially concurrently with the second processor updating the second storage nodes.

2. The system of claim 1, wherein the first group lock, the first entry lock and the second entry lock are spinlocks.

3. The system of claim 1, wherein the caching structure includes an entry lock for each entry in the caching structure.

4. The system of claim 1, wherein the computer memory comprises processor cache memory.

5. The system of claim 1, wherein the computer memory comprises random access memory.

6. The system of claim 1, wherein the multiple locks are applied during a write operation and not during a read operation.

7. A method for updating cached data, the method comprising:
   receiving updated data for a first entry in a cache, the cache including multiple locks and a plurality of entries stored in the cache;
   receiving updated data for a second entry in the cache;
   obtaining, by a first thread, a first group lock and a first entry lock, the first entry lock controlling access to the first entry in the cache, the first group lock controlling access to at least the first entry and the second entry;
   identifying first storage nodes associated with the first ent using a first associative array value that associates the first storage nodes with the first entry;
   subsequent to identifying the first storage nodes, releasing, by the first thread, the first group lock while retaining the first entry lock;
   disassociating the first storage nodes from the first entry by deleting the first associative array value;
   obtaining, by a second thread, the first group lock and a second entry lock, the first group lock controlling access to at least the first entry and the second entry, the first group lock obtained after obtaining the first group lock and prior to releasing the first group lock, the second entry lock controlling access to the second entry in the cache; and
   updating, by the first thread, the first entry and updating, by the second thread, the second entry, wherein the updating by the first thread and the second thread occur at least partially concurrently.

8. The method of claim 7, wherein obtaining, by the first thread, the first group lock and the first entry lock comprises obtaining the first group lock and the first entry lock as shared locks.

9. The method of claim 8, wherein obtaining, by the second thread, the first group lock and the second entry lock comprises obtaining the first group lock and the second entry lock as shared locks.

10. The method of claim 7 further comprising:
obtaining, by the first thread, a first exclusive lock for the first entry prior to updating the first entry; and
obtaining, by the second thread, a second exclusive lock for the second entry prior to updating the second entry.

11. The method of claim 10, wherein obtaining the first exclusive lock comprises converting the first entry lock from a shared lock to an exclusive lock.

12. The method of claim 10, wherein the first exclusive lock for the first entry is distinct from the first entry lock.

13. The method of claim 7 further comprising:
releasing, by the first thread, the first entry lock subsequent to updating the first entry; and
releasing, by the second thread, the second entry lock subsequent to updating the second entry.

14. The method of claim 7 further comprising, obtaining, by the first thread, a lock on a data structure for maintaining priority order and updating the data structure to reflect the update to the first entry.

15. The method of claim 7, wherein the first entry lock and second entry lock are spinlocks.

16. The method of claim 7, wherein the first entry lock and second entry lock are semaphores.

17. The method of claim 7, wherein the first entry lock is configurable to function as an exclusive lock or a shared lock.

18. The method of claim 7, wherein the first entry lock functions as a write lock or a read lock.

19. The method of claim 7, wherein the caching structure includes an entry lock for each entry in the caching structure.

20. The method of claim 7, wherein the cache comprises:
a hash table configured to map key/value pairs, each key/value pair comprising a key portion and a value portion;
the first data structure comprising a doubly-linked list that reflects the access order of data in the cache; and
one or more linked lists of storage blocks for storing data, wherein each value portion references a linked-list of one or more storage blocks.

21. The method of claim 20, wherein the caching structure includes a bucket lock for each bucket of the hash table.

22. The method of claim 7, wherein the first thread is operating on a first processor and the second thread is operating on a second processor.

23. Non-transitory computer storage having stored thereon instructions that, when executed by a computer system, cause the computer system to perform operations comprising:
receiving updated data for a first entry and a second entry in a cache, the cache including multiple locks and a plurality of entries;
obtaining, by a first thread, a first group lock and a first entry, the first entry lock controlling access to the first entry in the cache, the first group lock controlling access to at least the first entry and the second entry;
identifying first storage nodes associated with the first ent using a first associative array value that associates the first storage nodes with the first entry;
subsequent to the identifying the first storage nodes, releasing, by the first thread, the first group lock while retaining the first entry lock;
disassociating the first storage nodes from the first entry by deleting the first associative array value;
obtaining, by a second thread, the first group lock and a second entry lock, the first group lock controlling access to at least the first entry and the second entry, the first group lock obtained after obtaining the first group lock and prior to releasing the first group lock, the second entry lock controlling access to the second entry in the cache; and
updating, by the first thread, the first entry and updating, by the second thread, the second entry, wherein the updating by the first thread and the second thread occur at least partially concurrently.

24. The non-transitory computer storage of claim 23, wherein obtaining, by the first thread, the first group lock and the first entry lock comprises obtaining the first group lock and the first entry lock as shared locks.

25. The non-transitory computer storage of claim 24, wherein obtaining, by the second thread, the first group lock and the second entry lock comprises obtaining the first group lock and the second entry lock as shared locks.

26. The non-transitory computer storage of claim 23 further comprising:
obtaining, by the first thread, a first exclusive lock for the first entry prior to updating the first entry; and
obtaining, by the second thread, a second exclusive lock for the second entry prior to updating the second entry.

27. The non-transitory computer storage of claim 23, the operations further comprising:
releasing, by the first thread, the first entry lock subsequent to updating the first entry; and
releasing, by the second thread, the second entry lock subsequent to updating the second entry.

28. The non-transitory computer storage of claim 23, wherein the caching structure includes a lock for a group of entries in the caching structure.

29. The non-transitory computer storage of claim 23, wherein the caching structure further comprises:
a first data structure configured to track the access order of data in the caching structure;
a second data structure configured to map key/value pairs, each key/value pair comprising a key portion and a value portion; and
one or more of a third data structure configured to track storage blocks for storing data.

30. The non-transitory computer storage of claim 23, wherein the caching structure includes a lock for each entry of the first data structure.

* * * * *

UNITED STATES PATENT AND TRADEMARK OFFICE
CERTIFICATE OF CORRECTION

| | | |
|---|---|---|
| PATENT NO. | : 9,229,869 B1 | |
| APPLICATION NO. | : 13/720893 | |
| DATED | : January 5, 2016 | |
| INVENTOR(S) | : Vishal Parakh | |

It is certified that error appears in the above-identified patent and that said Letters Patent is hereby corrected as shown below:

Specification

In column 12 at line 28, Change "spinning" to --spinning.--.

In column 13 at line 61, Change "availabe" to --available--.

In column 13 at line 67, Change "processer" to --processor--.

In column 15 at line 28, Change "processer" to --processor--.

Claims

In column 27 at line 56, In Claim 1, after "using" insert --a--.

In column 28 at line 48 (approx.), In Claim 7, change "ent" to --entry--.

In column 30 at line 3, In Claim 23, change "ent" to --entry--.

Signed and Sealed this
Nineteenth Day of July, 2016

Michelle K. Lee
*Director of the United States Patent and Trademark Office*